US012368262B2

(12) United States Patent
Shettar et al.

(10) Patent No.: US 12,368,262 B2
(45) Date of Patent: Jul. 22, 2025

(54) ELECTRICAL CONNECTOR SYSTEM

(71) Applicants: TE Connectivity Solutions GmbH, Schaffhausen (CH); Tyco Electronics UK Ltd., Swindon (GB); TE CONNECTIVITY INDIA PRIVATE LIMITED, Bangalore (IN)

(72) Inventors: Vinayakumar Shettar, Middletown, PA (US); Richard C. Batley, III, Jonestown, PA (US); John Marsh, Swindon (GB); Stanrich Fernandes, Middletown, PA (US); Ramesh S., Bangalore (IN); Steward Keyser, III, Middletown, PA (US); Emma L. Workman, Middletown, PA (US)

(73) Assignees: TE Connectivity Solutions GmbH, Schaffhausen (CH); Tyco Electronics UK Ltd., Swindon (GB)

( * ) Notice: Subject to any disclaimer, the term of this patent is extended or adjusted under 35 U.S.C. 154(b) by 445 days.

(21) Appl. No.: 17/889,339

(22) Filed: Aug. 16, 2022

(65) Prior Publication Data

US 2024/0006794 A1 Jan. 4, 2024

(30) Foreign Application Priority Data

Jul. 1, 2022 (IN) ............................ 202241038047

(51) Int. Cl.
*H01R 13/422* (2006.01)
*H01R 13/24* (2006.01)

(52) U.S. Cl.
CPC ..... *H01R 13/4223* (2013.01); *H01R 13/2457* (2013.01)

(58) Field of Classification Search
CPC .............. H01R 13/4223; H01R 13/627; H01R 13/2457; H01R 13/111; H01R 13/052; H01R 13/5219; H01R 13/24; H01R 13/442; H01R 2107/00
USPC .......................................................... 439/595
See application file for complete search history.

(56) References Cited

U.S. PATENT DOCUMENTS 4,626,055 A * 12/1986 Baker ................ H01R 13/5219 439/350
4,944,688 A * 7/1990 Lundergan ........... H01R 13/443 439/752
5,595,509 A * 1/1997 Fry .................... H01R 13/4362 439/752
5,741,162 A * 4/1998 Kourimsky .......... H01R 13/432 439/748
6,042,433 A * 3/2000 Chen .................... H01R 13/114 439/852

(Continued)

FOREIGN PATENT DOCUMENTS

CN 106816737 A * 6/2017 ............. H01R 13/02
CN 106816738 B * 7/2020 ............. H01R 13/03

(Continued)

*Primary Examiner* — Peter G Leigh

(57) ABSTRACT

An electrical connector system is provided and includes a connector housing including a base and a plurality of terminal cavities extending through the base. The base includes a retention shoulder within each terminal cavity. The electrical connector system includes terminals received in the corresponding terminal cavities. Each terminal includes a locking lance engaging the corresponding retention terminal to retain the terminal in the corresponding terminal cavity. Each locking lance includes a strengthening rib extending length-wise along the locking lance.

26 Claims, 16 Drawing Sheets

(56) References Cited

U.S. PATENT DOCUMENTS

| | | | | |
|---|---|---|---|---|
| 6,193,549 | B1 * | 2/2001 | Suzuki | H01R 13/4223 439/511 |
| 6,994,596 | B2 * | 2/2006 | Katsuma | H01R 13/432 439/746 |
| 7,014,515 | B2 * | 3/2006 | Lutsch | H01R 13/113 439/852 |
| 7,217,161 | B1 * | 5/2007 | Tyler | H01R 13/432 439/748 |
| 7,303,447 | B1 * | 12/2007 | Tyler | H01R 4/185 439/748 |
| 7,347,741 | B1 * | 3/2008 | Yeomans | H01R 24/20 439/744 |
| 7,942,707 | B2 * | 5/2011 | Orris | H01R 13/432 439/748 |
| 8,210,864 | B1 * | 7/2012 | Hernandez | H01R 13/4362 439/352 |
| 9,917,381 | B1 * | 3/2018 | Campbell | H01R 9/24 |
| 10,381,766 | B2 * | 8/2019 | Bhagyanathan Sathianathan | H01R 13/432 |
| 10,522,934 | B2 * | 12/2019 | Zhang | H01R 24/28 |
| 10,950,967 | B2 * | 3/2021 | Probert | H01R 13/4364 |
| 11,075,479 | B2 * | 7/2021 | Bhagyanathan Sathianathan | H01R 13/187 |
| 2004/0110427 | A1 * | 6/2004 | Shi | H01R 13/4367 439/752 |
| 2004/0253881 | A1 * | 12/2004 | Sakurai | H01R 4/185 439/752 |
| 2005/0014422 | A1 * | 1/2005 | Patel | H01R 13/114 439/851 |
| 2009/0036002 | A1 * | 2/2009 | Arai | H01R 13/432 439/825 |

FOREIGN PATENT DOCUMENTS

| | | | | |
|---|---|---|---|---|
| DE | 4224528 | A1 * | 2/1993 | H01R 13/4365 |
| DE | 102014003701 | A1 * | 10/2014 | H01R 13/422 |
| EP | 3435491 | A1 * | 1/2019 | H01R 12/716 |
| FR | 0849836 | A1 * | 3/2003 | H01R 13/521 |
| JP | 0389955 | A2 * | 6/1995 | H01R 13/4365 |
| JP | 0511649 | B1 * | 11/1996 | H01R 13/4362 |

* cited by examiner

ELECTRICAL CONNECTOR SYSTEM

CROSS REFERENCE TO RELATED APPLICATIONS

This application claims benefit to Indian Application No. 202241038047, filed 1 Jul. 2022, the subject matter of which is herein incorporated by reference in its entirety.

BACKGROUND OF THE INVENTION

The subject matter herein relates generally to electrical connectors.

Electrical connectors are used within electrical connector systems to provide an electrical connection between various components of the system. For example, the electrical connectors may transmit data and/or power across the connector interface. Electrical connectors terminated to ends of cables are known as cable connectors and the cables transmit the data and/or power to/from the electrical connector to a remote location within the system.

Conventional systems may have demand for various electrical connectors having different numbers of terminals, such as to change the number of data lines or to change the amount of power transmitted by the electrical connectors. For example, such conventional systems may include a two-position connector, a three-position connector, a four-position connector, a six-position connector, a nine-position connector, a twelve-position connector, a sixteen-position connector, or other types of connectors. Typically, each connector is designed differently to provide the desired number of terminals. Such systems are expensive to design and manufacture as each connector is designed and manufactured separately.

There is a need for electrical connectors having interchangeable parts to reduce design and manufacture time and cost.

BRIEF DESCRIPTION OF THE INVENTION

In one embodiment, an electrical connector system is provided and includes a connector housing including a base and a plurality of terminal cavities extending through the base. The base includes a retention shoulder within each terminal cavity. The electrical connector system includes terminals received in the corresponding terminal cavities. Each terminal includes a locking lance engaging the corresponding retention terminal to retain the terminal in the corresponding terminal cavity. Each locking lance includes a strengthening rib extending length-wise along the locking lance.

In another embodiment, an electrical connector system is provided and includes a connector housing including a base and a plurality of terminal cavities extending through the base. The base includes a retention shoulder within each terminal cavity. The connector housing extends between a mating end and a cable end. The mating end configured to be mated with a mating electrical connector. The connector housing includes a seal pocket at the mating end. The electrical connector system includes a facial seal received in the seal pocket. The facial seal includes a first sealing surface engaging the connector housing and is sealed against the connector housing. The facial seal includes a second sealing surface configured to engage a mating connector housing of the mating electrical connector. The electrical connector system includes terminals received in the corresponding terminal cavities. The terminals are terminated to ends of cables extending from the cable end of the connector housing. Each terminal includes a locking lance engaging the corresponding retention terminal to retain the terminal in the corresponding terminal cavity.

In a further embodiment, an electrical connector system is provided and includes a connector housing including a base and a plurality of terminal cavities extending through the base. The base includes a retention shoulder within each terminal cavity. The connector housing extends between a mating end and a cable end. The mating end configured to be mated with a mating electrical connector. The electrical connector system includes terminals received in the corresponding terminal cavities. Each terminal includes a locking lance engaging the corresponding retention terminal to retain the terminal in the corresponding terminal cavity. Each terminal includes a main body extending between a front and a rear. The terminal includes a socket at the front configured to receive a pin terminal of the mating electrical connector. The terminal includes a plurality of mating beams extending into the socket to electrically connect to the pin terminal.

DETAILED DESCRIPTION OF THE INVENTION

Figure 1:
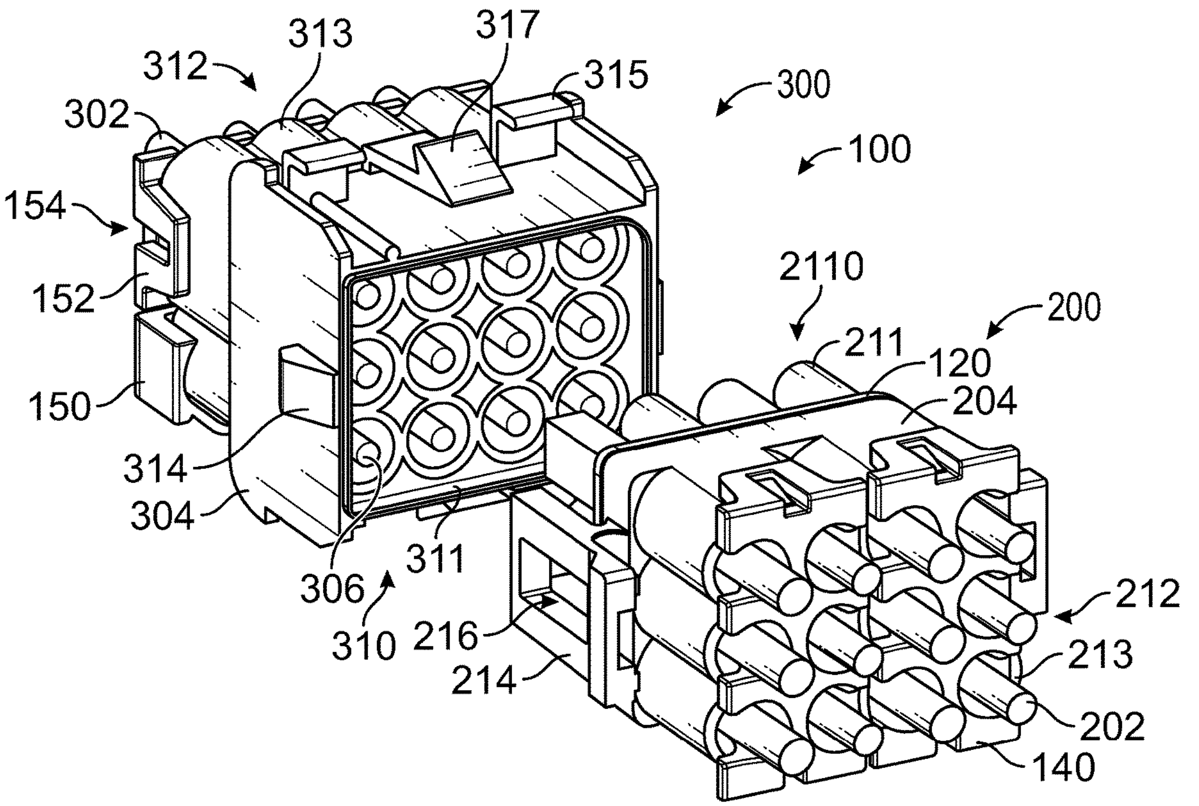
FIG. 1 illustrates an electrical connector system in accordance with an exemplary embodiment showing a first electrical connector and a second electrical connector poised for mating with each other.
Figure 2:
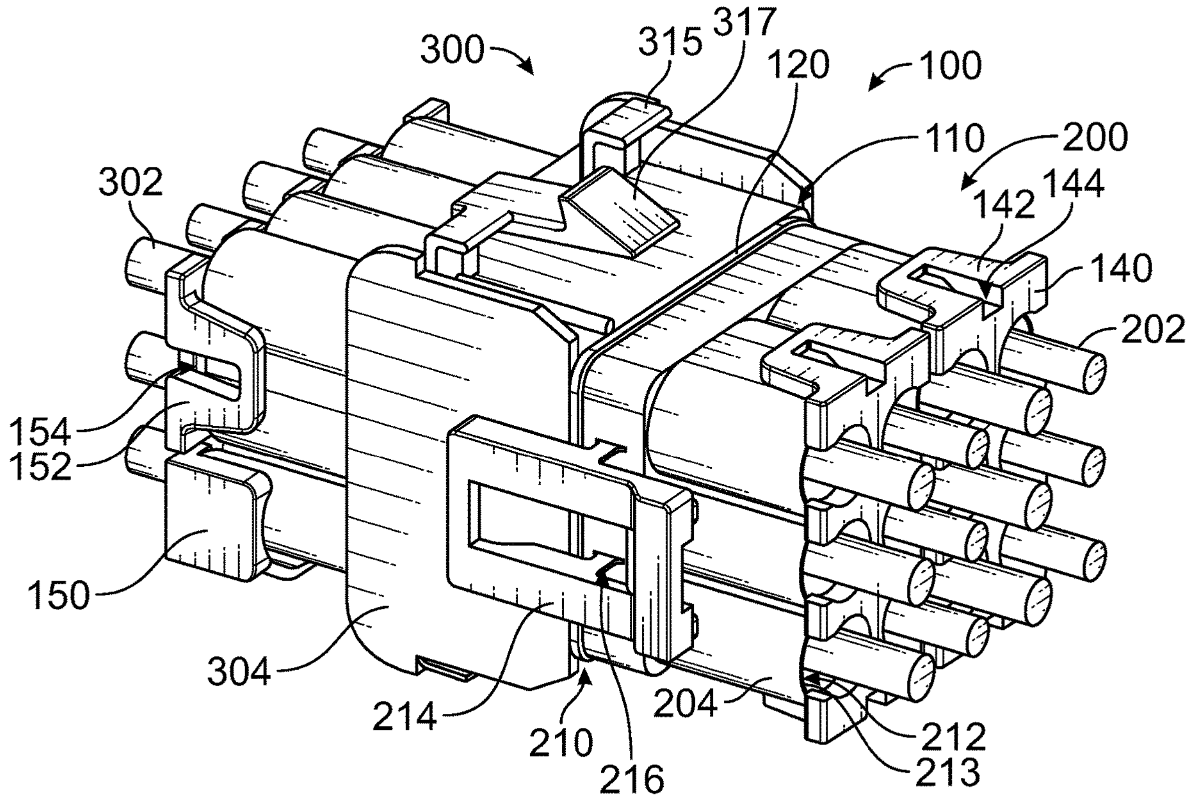
FIG. 2 illustrates the electrical connector system in accordance with an exemplary embodiment showing the first electrical connector and the second electrical connector mated together.

FIG. 1 illustrates an electrical connector system 100 in accordance with an exemplary embodiment showing a first electrical connector 200 and a second electrical connector 300 poised for mating with each other. FIG. 2 illustrates the electrical connector system 100 in accordance with an exemplary embodiment showing the first electrical connector 200 and the second electrical connector 300 mated together.

The electrical connectors 200, 300 are configured to be mated at a separable mating interface 110. The electrical connector 300 is considered a mating electrical connector for the electrical connector 200 and components thereof may be identified hereinafter as "mating" components. The electrical connector 200 is considered a mating electrical connector for the electrical connector 300 and components thereof may be identified hereinafter as "mating" components.

In the illustrated embodiment, the electrical connectors 200, 300 are cable electrical connectors provided at ends of cables 202, 302, respectively. In an exemplary embodiment, the electrical connectors 200, 300 are power connectors configured to transmit power across the separable mating interface; however, the electrical connectors 200, 300 may additionally or alternatively transmit data across the separable mating interface. In various embodiments, the electrical connectors 200, 300 may be used in automotive applications, industrial applications, appliances, or other applications.

Figure 4:
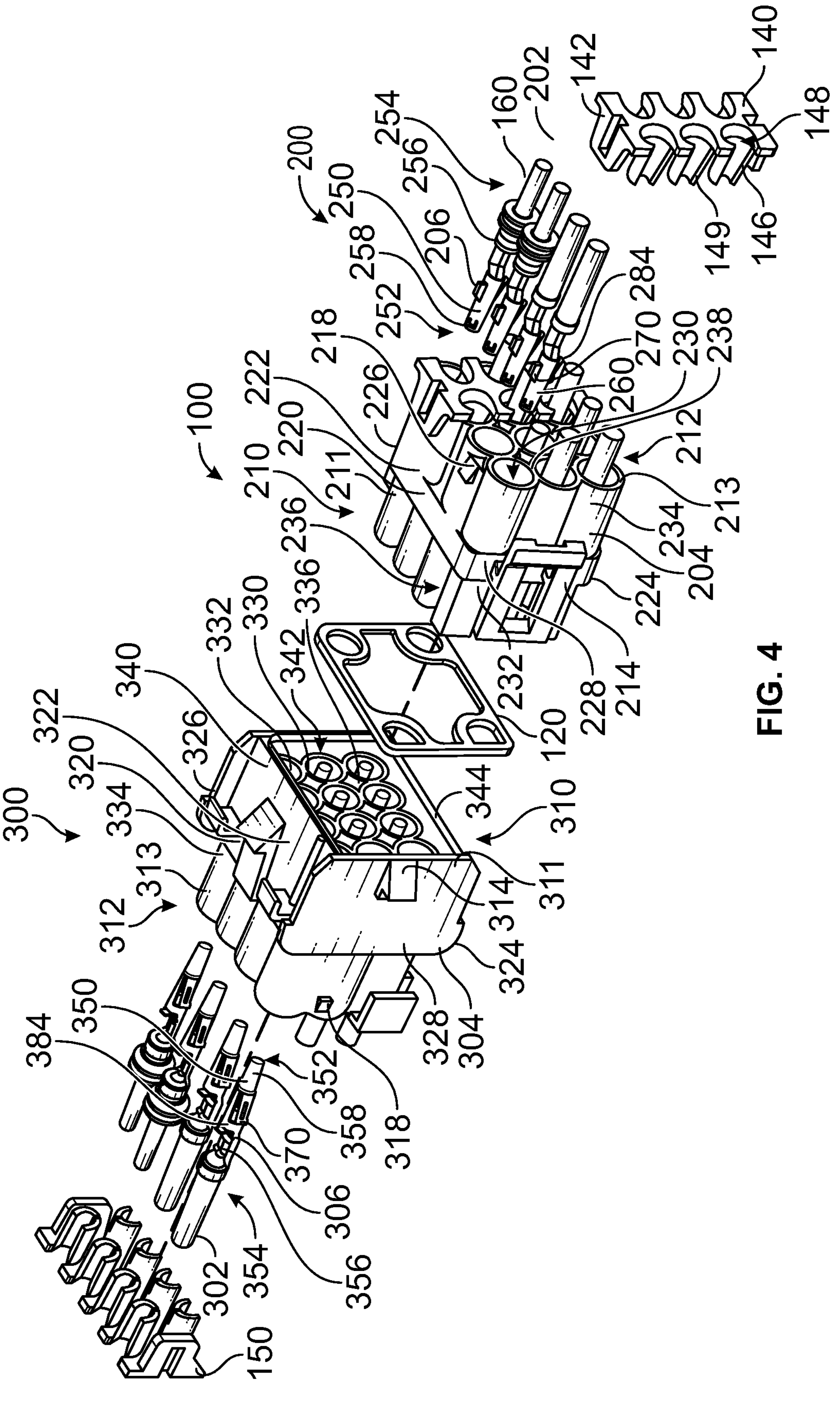
FIG. 4 is an exploded view of the electrical connector system in accordance with an exemplary embodiment.

The electrical connector 200 includes a connector housing 204 holding terminals 206 (shown in FIG. 4). The terminals 206 are terminated to corresponding cables 202. The connector housing 204 extends between a mating end 210 at a front 211 of the connector housing 204 and a cable end 212 at a rear 213 of the connector housing 204. The cables 202 extend from the cable end 212. The mating end 210 is configured to be mated to the electrical connector 300.

In an exemplary embodiment, the electrical connector 200 includes one or more terminal position assurance (TPA) devices 140 coupled to the connector housing 204. The TPA devices 140 are used to ensure that the terminals 206 are properly loaded and retained in the connector housing 204. In the illustrated embodiment, the TPA devices 140 are coupled to the rear 213 of the connector housing 204. The cables 202 extend through the TPA devices 140. The TPA devices 140 may engage rear ends of the terminals 206. In various embodiments, the TPA devices 140 are secured to the connector housing 204 using latches 142. Other securing devices may be used in alternative embodiments. In an exemplary embodiment, the latches 142 to include windows 144. The windows 144 provide visual access to the latching features of the connector housing 204 such that the installer is able to visually inspect the connection between the latches 142 and the latching features. Proper installation of the TPA devices 140 provides assurance to the installer that the terminals 206 are properly installed within the connector housing 204.

In the illustrated embodiment, the mating end 210 of the connector housing 204 is configured to be plugged into the electrical connector 300. The electrical connector 200 thus defines a plug connector and the mating electrical connector 300 defines a receptacle connector that receives the mating end 210 of the plug connector 200.

The electrical connector 300 includes a connector housing 304 holding terminals 306. The terminals 306 are terminated to corresponding cables 302. The connector housing 304 extends between a mating end 310 at a front 311 of the connector housing 304 and a cable end 312 at a rear 313 of the connector housing 304. The cables 302 extend from the cable end 312. The mating end 310 is configured to be mated to the electrical connector 200.

In the illustrated embodiment, the mating end 310 of the connector housing 304 defines a receptacle that receives the mating end 210 of the electrical connector 200. The electrical connector 300 thus defines a receptacle connector and the mating electrical connector 200 defines a plug connector.

In an exemplary embodiment, the electrical connector 300 includes one or more terminal position assurance (TPA) devices 150 coupled to the connector housing 304. The TPA devices 150 are used to ensure that the terminals 306 are properly loaded and retained in the connector housing 304. In the illustrated embodiment, the TPA devices 150 are coupled to the rear 313 of the connector housing 304. The cables 302 extend through the TPA devices 150. The TPA devices 150 may engage rear ends of the terminals 306. In various embodiments, the TPA devices 150 are secured to the connector housing 304 using latches 152. Other securing devices may be used in alternative embodiments. In an exemplary embodiment, the latches 152 to include windows 154. The windows 154 provide visual access to the latching features of the connector housing 304 such that the installer is able to visually inspect the connection between the latches 152 and the latching features. Proper installation of the TPA devices 150 provides assurance to the installer that the terminals 306 are properly installed within the connector housing 304.

In an exemplary embodiment, the electrical connector 300 is configured to be mounted to another component, such as a panel. For example, the electrical connector 300 may be received in a panel opening in the panel such that the mating end 310 of the connector housing 304 is located forward of the panel and the cable end 312 of the connector housing 304 is located rearward of the panel. The electrical connector 300 includes mounting tabs 315 and a latch 317 used to secure the electrical connector 300 to the panel. For example, the mounting tabs 315 may engage a rear side of the panel in the latch 317 may be latchably coupled to a front side of the panel. The latch 317 is deflectable to allow removal of the electrical connector 300 from the panel. Optionally, mounting tabs 315 and latches 317 may be provided at both the top and the bottom of the connector housing 304. Other types of mounting features may be used in alternative embodiments to secure the electrical connector 300 to the panel. For example, fasteners may be used to secure the electrical connector 300 to the panel.

In an exemplary embodiment, the connector housing 304 includes latching features 314 used to secure the electrical connector 300 to the electrical connector 200. For example, the latching features 314 may be latching tabs extending from the sides of the connector housing 304. Each latching tab may include a latching surface. The connector housing 204 includes latches 214 that interface with the latching features 314 to secure the electrical connector 200 to the electrical connector 300. The latches 214 are provided at opposite sides of the connector housing 204. The latches 214 are deflectable latches configured to be released from the latching features 314 to allow removal of the electrical connector 200 from the electrical connector 300. In an exemplary embodiment, the latch 214 includes a window 216 through the main body of the latch 214. The window 216 provides a visual access to the latching features 314. For example, the installer is able to visually inspect the connection between the latch 214 and the latching features 314 to verify proper latched connection between the electrical connectors 200, 300.

In an exemplary embodiment, a facial seal 120 is provided at the mating interface 110 between the electrical connectors 200, 300. The facial seal 120 is configured to be sealingly coupled to the front 211 of the connector housing 204 and is configured to be sealingly coupled to the front 311 of the connector housing 304. The facial seal 120 provides a sealed interface between the electrical connectors 200, 300. In an exemplary embodiment, the facial seal 120 extend circumferentially around the perimeter of the connector housing 204 and/or the connector housing 304. The facial seal 120 may be compressed between the connector housings 204, 304 when the electrical connectors 200, 300 are mated. The facial seal 120 may be a sealing gasket. In various embodiments, the facial seal 120 is manufactured from a rubber material. In various embodiments, the cables 202 and/or the cables 302 may be sealed within the connector housings 204, 304, respectively. For example, cable seals (not shown) may be provided between the cables 202 and the connector housing 204 and/or between the cables 302 and the connector housing 304.

Figure 3:
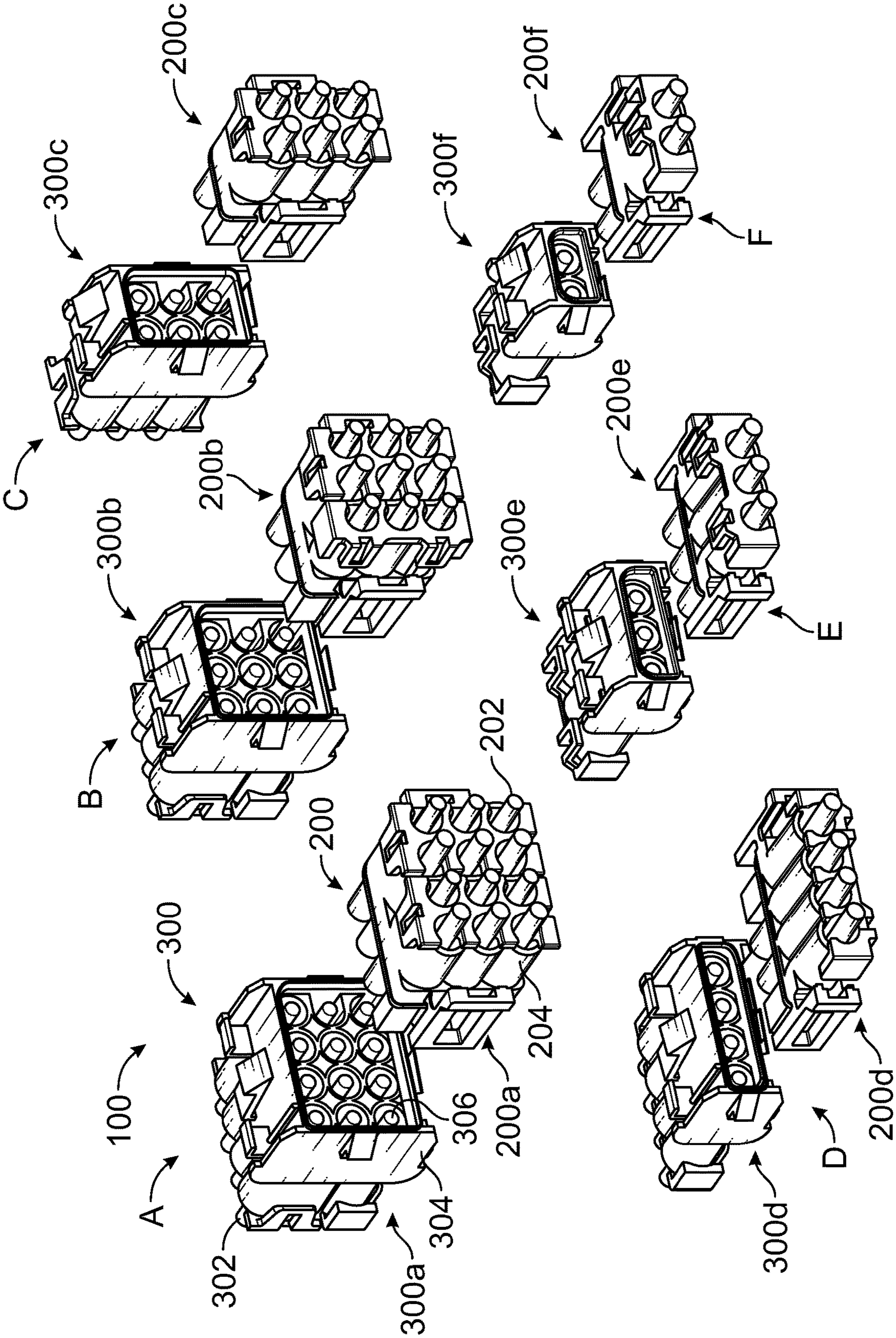
FIG. 3 illustrates a product family of the electrical connectors for the electrical connector system in accordance with an exemplary embodiment.

FIG. 3 illustrates a product family of the electrical connectors 200, 300 for the electrical connector system 100. FIG. 3 illustrates complementary pairs of the electrical connectors 200, 300. Each pair includes similar features; however, each pair has a different number of terminals 206, 306 and cables 202, 302. The connector housings 204, 304 are sized and shaped to accommodate the different numbers of terminals 206, 306 and cables 202, 302.

In the illustrated embodiment, a first pair of electrical connectors A are twelve position electrical connectors 200*a*, 300*a*. The terminals and cables are arranged in a 4×3 matrix (4 columns X 3 rows). A second pair of electrical connectors B are nine position electrical connectors 200*b*, 300*b*. The terminals and cables are arranged in a 3×3 matrix (3 columns X 3 rows). A third pair of electrical connectors C are six position electrical connectors 200*c*, 300*c*. The terminals and cables are arranged in a 2×3 matrix (2 columns X 3 rows). A fourth pair of electrical connectors D are four position electrical connectors 200*d*, 300*d*. The terminals and cables are arranged in a 4×1 matrix (4 columns X 1 rows). A fifth pair of electrical connectors E are three position electrical connectors 200*e*, 300*e*. The terminals and cables are arranged in a 3×1 matrix (3 columns X 1 rows). A sixth pair of electrical connectors F are two position electrical connectors 200*f*, 300*f*. The terminals and cables are arranged in a 2×1 matrix (2 columns X 1 rows). Other types of electrical connectors having a different number of terminal positions may be provided in other embodiments.

FIG. 4 is an exploded view of the electrical connector system 100 in accordance with an exemplary embodiment. The electrical connector system 100 includes the first and second electrical connectors 200, 300 and the facial seal 120 between the first and second electrical connectors 200, 300. FIG. 4 shows subsets of the terminals 206 poised for loading into the connector housing 204 and one of the TPA devices 140 poised for loading into the connector housing 204. FIG. 4 shows subsets of the terminals 306 poised for loading into the connector housing 304 and one of the TPA devices 150 poised for loading into the connector housing 304.

Figure 5:
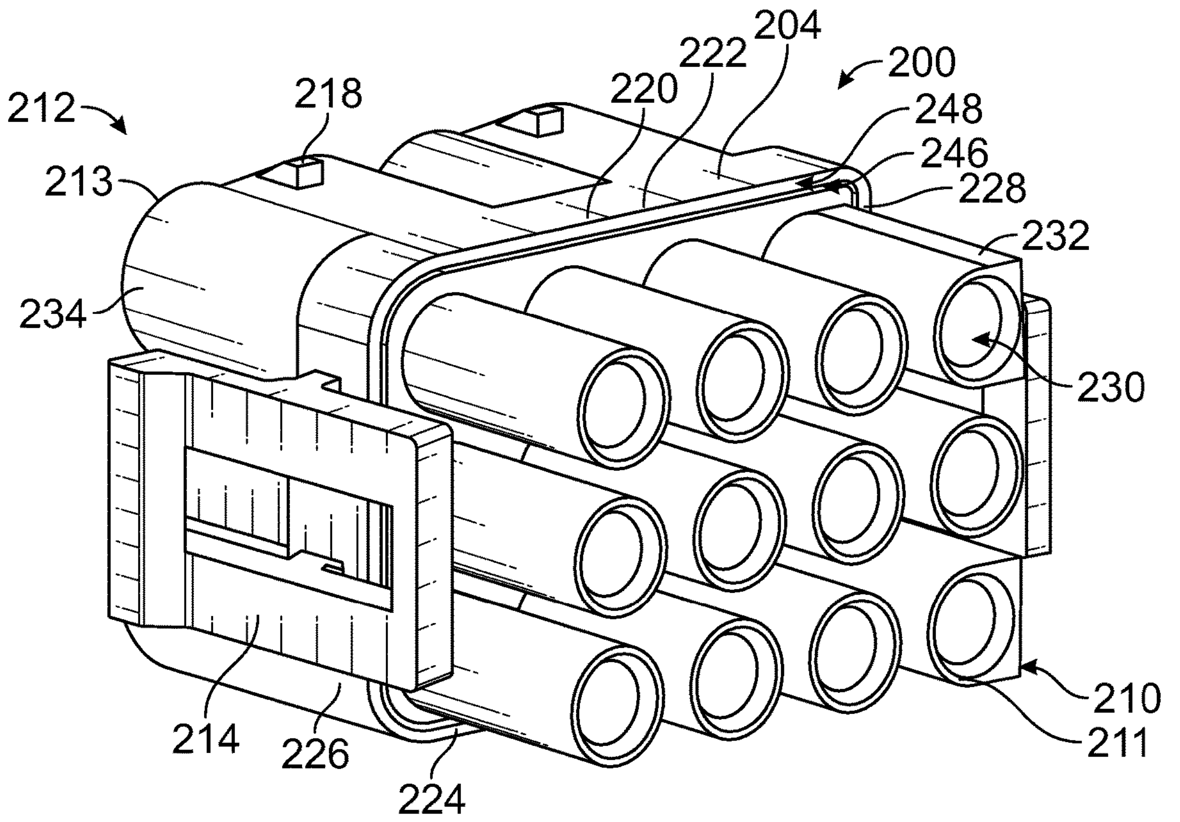
FIG. 5 is a front of the connector housing in accordance with an exemplary embodiment.
Figure 6:
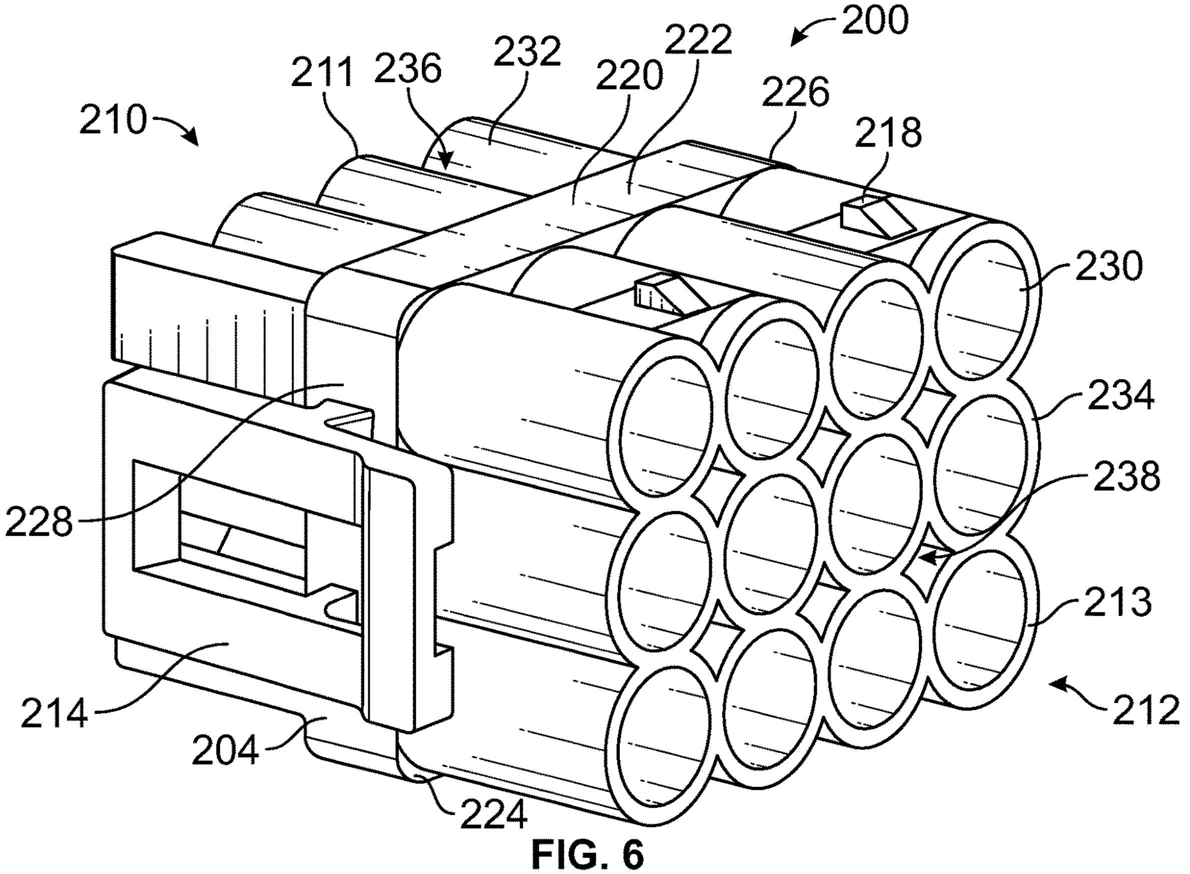
FIG. 6 is a rear of the connector housing in accordance with an exemplary embodiment.

With additional reference to FIGS. 5 and 6, which are front and rear perspective views, respectively, of the connector housing 204, the connector housing 204 includes a base 220 and a plurality of terminal channels 230 extending through the base 220. The terminal channels 230 receive corresponding terminals 206. In an exemplary embodiment, the base 220 extends between a top 222 and a bottom 224 of the connector housing 204. The base 220 extends between a first side 226 and a second side 228 of the connector housing 204. The base 220 may be generally rectangular shaped. However, the base 220 may have other shapes in alternative embodiments.

In an exemplary embodiment, the connector housing 204 includes terminal tubes 232 extending forward from the base 220 to the front 211 of the connector housing 204 and cable tubes 234 extending rearward from the base 220 to the rear 213 of the connector housing 204. The terminal channels 230 are open through the terminal tubes 232 and the cable tubes 234. The terminals 206 are received in the corresponding terminal tubes 232. The cables 202 are received in the corresponding cable tubes 234. Optionally, the terminals 206 may extend into the cable tubes 234 to connect with the cables 202. In various embodiments, the base 220 may be approximately centered between the front 211 and the rear 213. For example, the terminal tubes 232 may have lengths approximately equal to the cable tubes 234. However, in alternative embodiments, the base 220 may be closer to the front 211 or closer to the rear 213. In an exemplary embodiment, the connector housing 204 includes front pockets 236 located between corresponding terminal tubes 232 and rear pockets 238 located between corresponding cable tubes 234. The pockets 236, 238 may be filled with air. For example, material of the connector housing 204 may be removed to form the pockets 236, 238 and thus reduce the weight of the connector housing 204. In the illustrated embodiment, the terminal tubes 232 and the cable tubes 234 are generally cylindrical. However, the terminal tubes 232 and/or the cable tubes 234 may have other shapes in alternative embodiments. For example, one or more of the terminal tubes 232 may have a different shape (for example, have one or more flat surfaces, such as being D-shaped) for keyed mating with the receptacle connector 300.

In an exemplary embodiment, the connector housing 204 includes a seal pocket 246 at the mating end 210. The seal pocket 246 may be provided in the front surface of the base 220. The facial seal 120 is configured to be received in the seal pocket 246. In an exemplary embodiment, the seal pocket 246 includes a groove 248. The groove 248 extends circumferentially around the perimeter of the base 220, such as around the terminal tubes 232. The facial seal 120 may be pressed into the groove 248, such as by the connector housing 304, to lock the facial seal in the seal pocket 246.

In an exemplary embodiment, the latches 214 extend from the sides 226, 228 of the connector housing 204. The latches 214 may be located at other positions in alternative embodiments, such as along the top 222 and/or the bottom 224. In the illustrated embodiment, the latches 214 extend from the base 220.

In an exemplary embodiment, the connector housing 204 includes TPA latching elements 218 for securing the TPA devices 140 to the connector housing 204. In the illustrated embodiment, the TPA latching elements 218 are located at the top 222 and the bottom 224. The TPA latching elements 218 may be located proximate to the rear 213. For example, the TPA latching elements 218 may extend from one or more of the cable tubes 234. The TPA latching elements 218 may be at other locations in alternative embodiments.

With reference back to FIG. 4, in an exemplary embodiment, the TPA device 140 includes hollow inserts 146 configured to be plugged into the corresponding cable tubes 234. Each insert 146 includes a cable bore 148 that receives the corresponding cable 202. A distal end 149 of the insert 146 faces the rear end of the terminal 206. The distal end 149 of the insert 146 may engage the rear end of the terminal 206, such as to retain the terminal 206 in the terminal channel 230. If one of the terminals 206 is improperly loaded, such as not fully loaded, into the terminal channel 230, the distal end 149 of the insert 146 may bottom out against such terminal 206, which restricts the TPA device 140 from mating to the connector housing 204. For example, the latches 142 are unable to engage the TPA latching elements 218 when the TPA device 140 bottoms out against the improperly loaded terminal 206, which provides a visual indication to the installer that one of the terminals 206 is improperly loaded into the connector housing 204.

The terminals 206 are terminated to ends of the cables 202. In an exemplary embodiment, the terminals 206 are crimped onto the ends of the cables 202. In various embodiments, cable seals 160 may be provided at the ends of the cables 202. The terminals 206 may be crimped to the cable seals 160. The cable seals 160 are configured to sealingly engage the cables 202. The cable seals 160 are configured to be plugged into the corresponding cable tubes 234 to seal to the connector housing 204. The cable seals 160 prevent moisture or debris from entering the connector housing 204 through the rear 213. For example, the cable seals 160 seal against the cable tubes 234 and seal against the ends of the cables 202.

In an exemplary embodiment, the cable seals 160 are optional components. For example, the electrical connector 200 may be utilized with or without the cable seals 160. FIG. 4 illustrates two of the cables 202 having the cable seals 160 and two of the cables 202 without the cable seals 160 to illustrate the two different configurations. However, typically all of the cables 202 would either be sealed with the cable seals 160 or unsealed. The connector housing 204 is designed to receive the cables 202 with or without the cable seals 160. In other words, the same connector housing 204 may be used in either a sealed system or an unsealed system. Utilizing the same connector housing 204 with either sealed cables or unsealed cables reduces the overall cost of the electrical connector system 100, such as by reducing the total part numbers utilized within the electrical connector system 100. The design cost of the electrical connector system 100 is reduced because different connector housings to not need to be designed for both the sealed application and the unsealed application.

In various embodiments, the TPA devices 140 are not used when the cable seals 160 are utilized. For example, the cable tubes 234 are not sized to receive both the cable seals 160 and the TPA devices 140. Rather, the cable seals 160 may provide a visual assurance to the installer that the terminals 206 are fully loaded into the connector housing 204. For example, when the terminals 206 are not fully loaded into the connector housing 204, the cable seals 160 may be visible at or protruding from the cable tubes 234.

Figure 7:
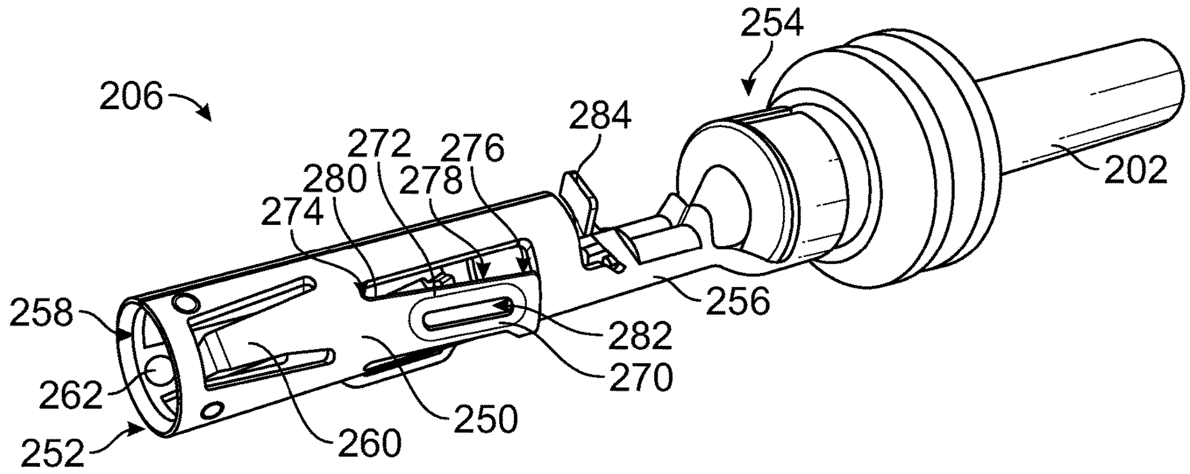
FIG. 7 is a front perspective views of exemplary embodiments of the terminal in accordance with an exemplary embodiment.
Figure 8:
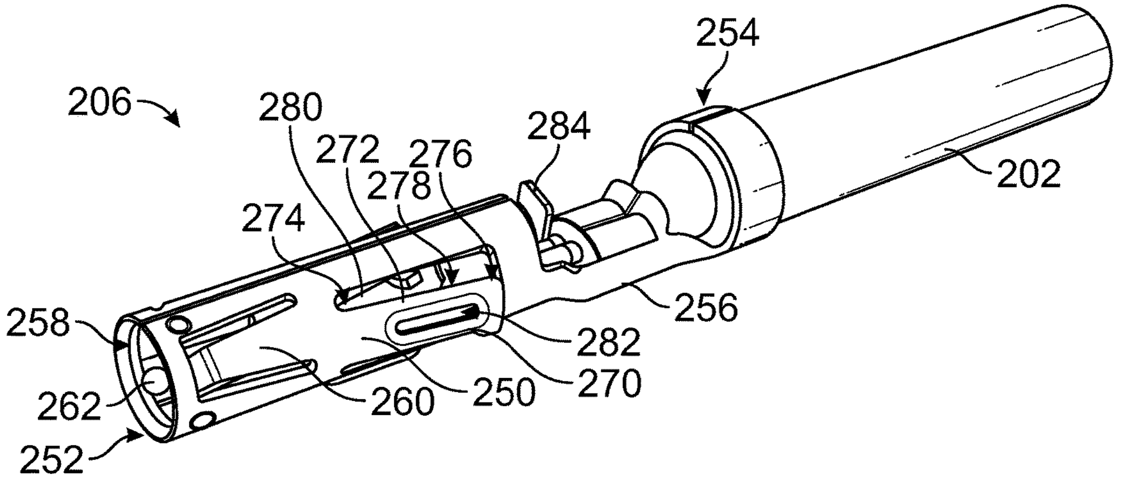
FIG. 8 is a front perspective views of exemplary embodiments of the terminal in accordance with an exemplary embodiment.

With additional reference to FIGS. 7 and 8, which are front perspective views of exemplary embodiments of the terminal 206, each terminal 206 includes a main body 250 extending between a mating end 252 and a terminating end 254. The terminating end 254 is configured to be terminated to the cable 202. In an exemplary embodiment, the terminal 206 includes a crimp barrel 256 at the terminating end 254 configured to be crimped to the end of the cable 202. FIG. 7 illustrates a sealed version of the terminal 206 with the cable seal 160 provided at the end of the cable 202. FIG. 8 illustrates an unsealed version of the terminal 206. The crimp barrel 256 is crimped directly to the outer jacket of the cable 202 on the unsealed version. The crimp barrel 256 is crimped to the cable seal 160 on the sealed version.

Figure 9:
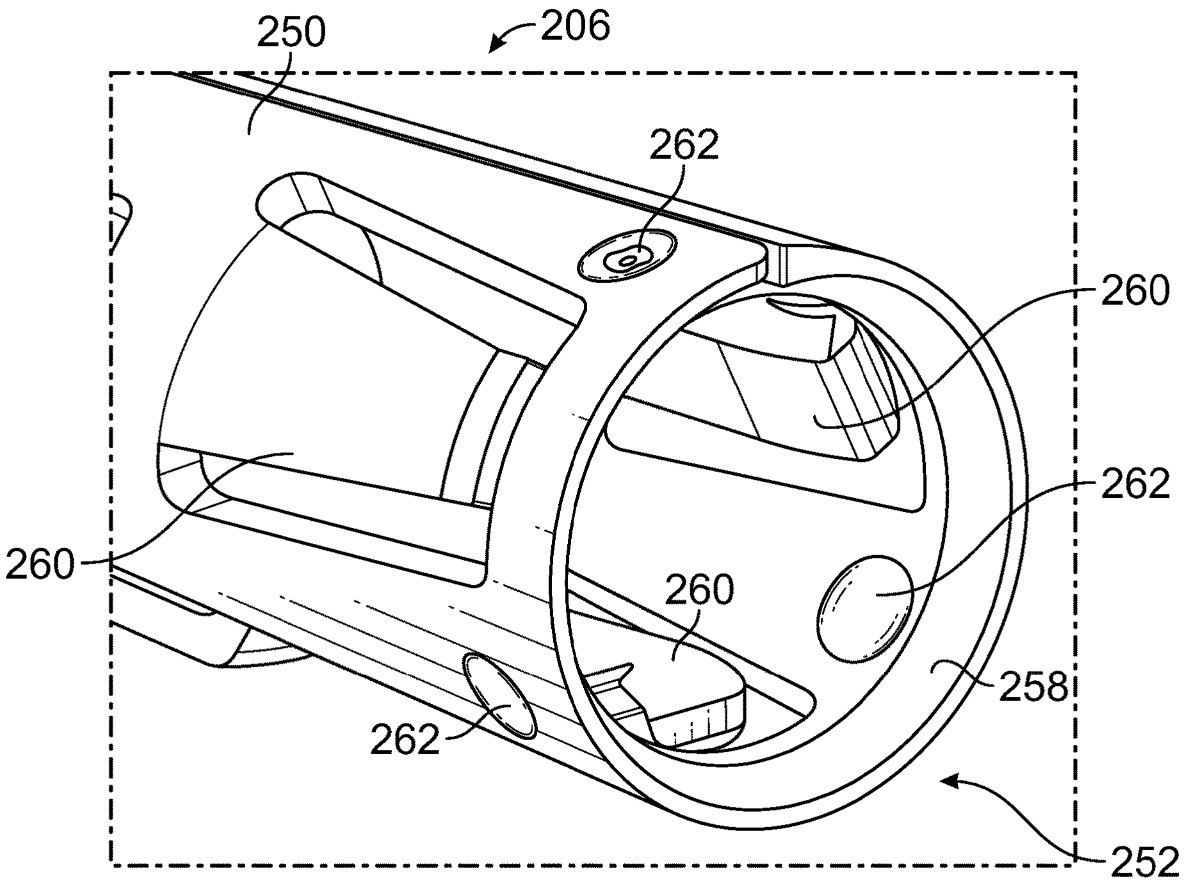
FIG. 9 is a front perspective view of a portion of the terminal in accordance with an exemplary embodiment.

With additional reference to FIG. 9, which is a front perspective view of a portion of the terminal 206, in an exemplary embodiment, the terminal 206 includes a socket 258 at the mating end 252. The socket 258 is configured to receive a pin of the terminal 306 (FIG. 4). In an exemplary embodiment, the terminal 206 is stamped and formed. For example, the terminal 206 may be stamped from a metal sheet and formed into a tubular shape defining the socket 258 at the mating end 252.

In an exemplary embodiment, the terminal 206 include mating beams 260 proximate to the front of the main body 250. Each mating beam 260 is stamped from the main body 250 and formed to have a curved mating interface proximate to the distal end thereof. The mating beam 260 is bent inward to extend into the socket 258 to interface with the terminal 306. The mating beam 260 is deflectable and configured to be deflected outward when interfacing with the terminal 306. Such deflection creates an internal spring force that biases the mating beam 260 inward toward the terminal 306 to maintain mechanical and electrical connection with the terminal 306. In the illustrated embodiment, the terminal 206 includes three of the mating beams 260 angularly offset and spaced equidistant from each other around the socket 258. However, the terminal 206 may include greater or fewer mating beams 260 in alternative embodiments.

In an exemplary embodiment, the terminal 206 includes centering bumps 262 proximate to the front of the main body 250. The centering bumps 262 are angularly offset from the mating beams 260 (for example, centered between the mating beams 260). The centering bumps 262 are configured to locate the terminal 306 coincident with the socket 258. For example, the centering bumps 262 prevent the terminal 306 from traveling too far to one side relative to the terminal 206, which prevents overstress of any one of the mating beams 260. In an exemplary embodiment, the centering bumps 262 are located forward of the mating interfaces of the mating beams 260 such that the centering bumps 262 interface with the terminal 306 prior to the mating beams 260 interfacing with the terminal 306 during mating. In other words, the centering bumps 262 to center the terminal 306 within the socket 258 prior to the terminal 306 engaging the mating beams 260.

Figure 10:
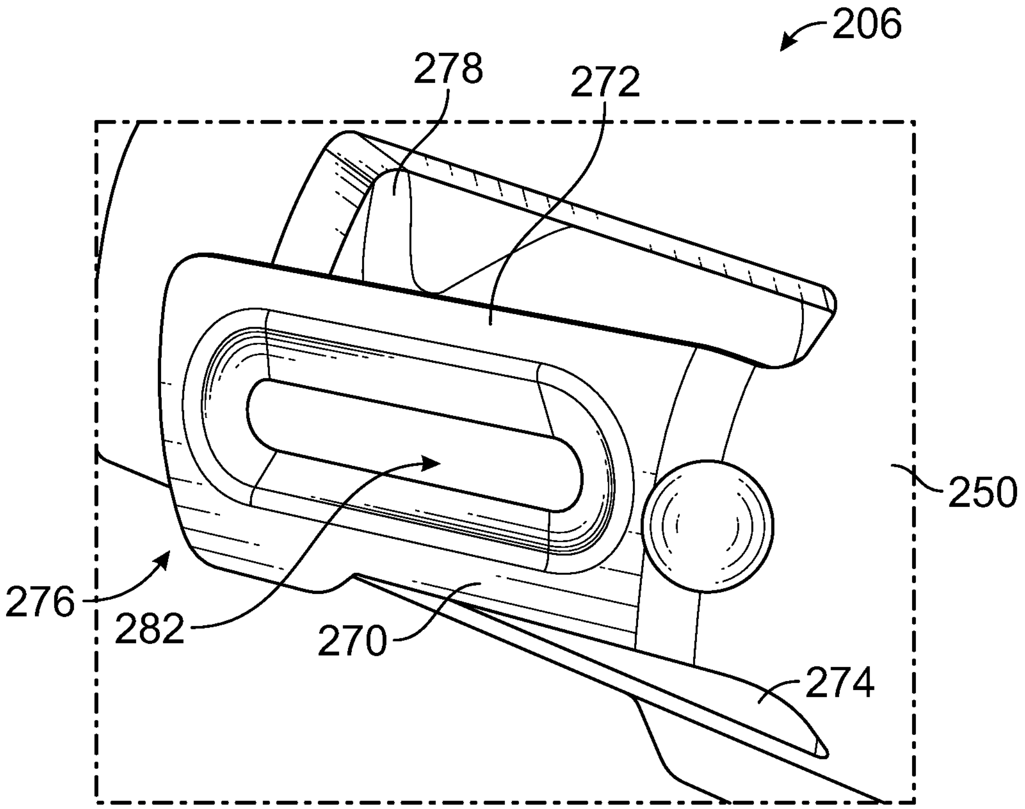
FIG. 10 is a perspective view of a portion of the terminal in an exemplary embodiment.
Figure 11:
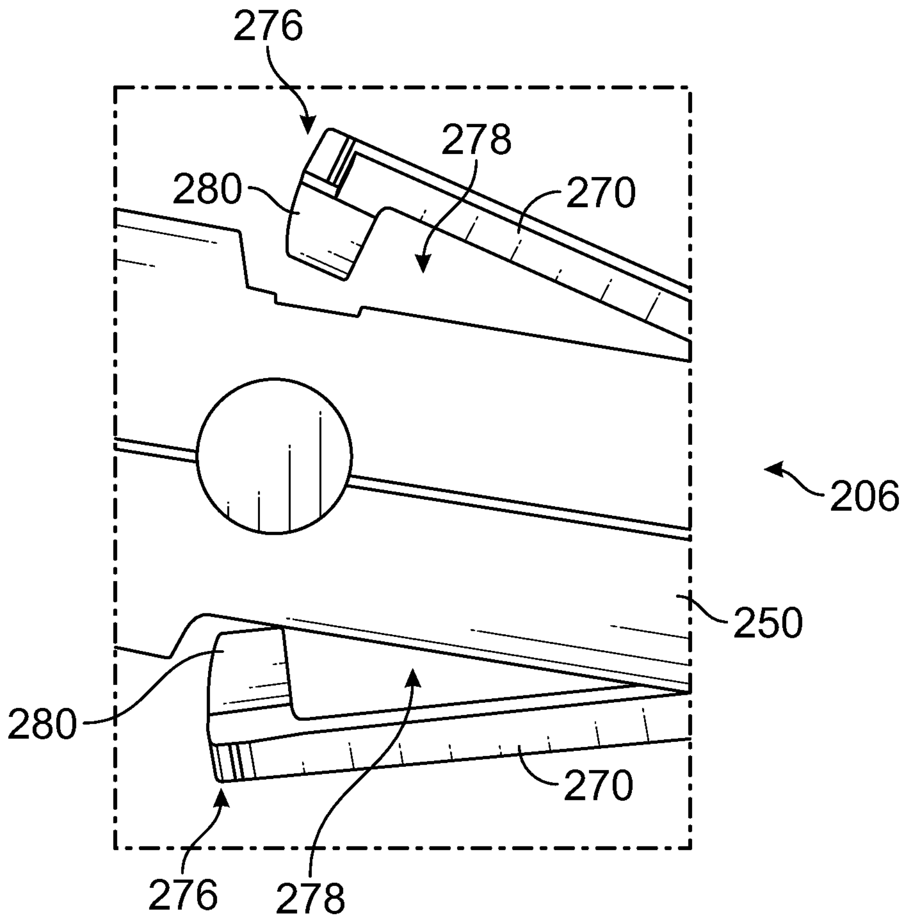
FIG. 11 is a top view of a portion of the terminal in an exemplary embodiment.

With reference back to FIGS. 4, 7, and 8, and with additional reference to FIGS. 10 and 11, which are a perspective and top view, respectively, of a portion of the terminal 206, in an exemplary embodiment, the terminal 206 includes locking lances 270. The locking lances 270 are used to secure the terminal 206 in the connector housing 204. In an exemplary embodiment, the locking lances 270 are formed integral with the main body 250. For example, the locking lances 270 are stamped and formed from the main body 250. The locking lances 270 are provided along opposite sides of the terminal 206. The locking lances 270 may be located at other positions in alternative embodiments. In the illustrated embodiment, the terminal 206 includes a pair of the locking lances 270; however, the terminal 206 may include greater or fewer locking lances 270 in alternative embodiments.

Each locking lance 270 includes a lance arm 272 extending between a fixed end 274 and a free end 276. The locking lance 270 is angled outward from the fixed end to the free end 276 to form a gap 278 between the free end 276 and the main body 250 of the terminal 206. In an exemplary embodiment, the locking lance 270 includes an end tab 280 extending inward from the free end 276 toward the main body 250. Optionally, the end tab 280 may extend generally perpendicular to the lance arm 272. The end tab 280 may substantially fills the gap 278, such as to prevent the cables 202 from entering the 278. The end tab 280 prevents snagging of the cables 202 on the locking lances 270 during assembly, which could damage the locking lances 270.

In an exemplary embodiment, the locking lance 270 includes a strengthening rib 282 extending length-wise along the locking lance 270. In various embodiments, the strengthening rib 282 is formed integral with the lance arm 272. For example, the strengthening rib 282 may be coined or pressed from the lance arm 272 during a forming process. The strengthening rib 282 increases a buckling force necessary to buckle the locking lance 270, such as when a pulling force in a rearward pulling direction is induced on the cable 202. In an exemplary embodiment, the strengthening rib 282 extends a majority of the length of the lance arm 272 between the fixed end 274 and the free end 276. For example, the strengthening rib 282 may extend greater than 50% of the length of the lance arm 272. In various embodiments, the strengthening rib 282 may extend greater than 75% of the length of the lance arm 272. In an exemplary embodiment, the strengthening rib 282 protrudes in a thickness direction from the lance arm 272 of the locking lance 270. For example, these strengthening rib 282 may extend inward from an inner surface of the lance arm 272 or outward from an exterior surface of the lance arm 272.

Figure 12:
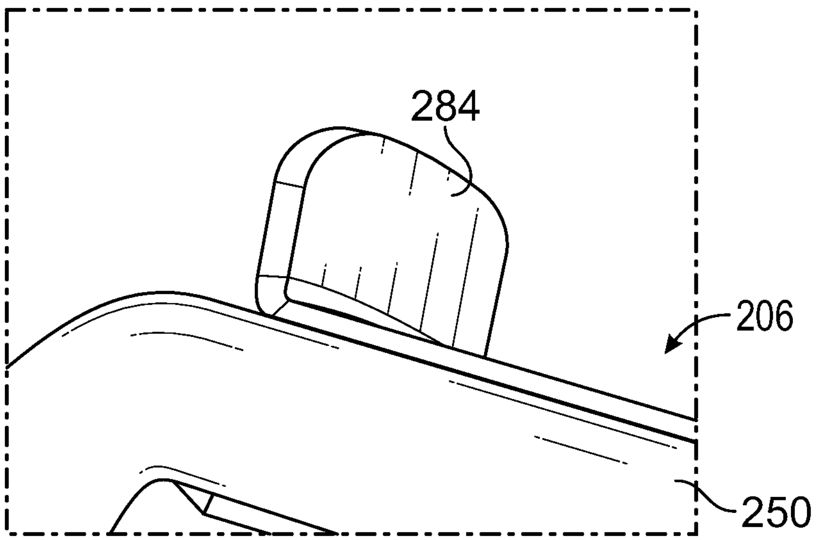
FIG. 12 is a perspective view of a rear portion of the terminal in accordance with an exemplary embodiment.

With reference back to FIGS. 4, 7, and 8, and with additional reference to FIG. 12, which is a perspective view of a rear portion of the terminal 206, the terminal 206 includes a stop tab 284 at the rear of the main body 250. The stop tab 284 may extend radially outward from the main body 250. In an exemplary embodiment, the stop tab 284 is formed integral with the main body 250, such as being stamped and formed with the main body 250. The stop tab 284 is used to locate the terminal 206 in the connector housing 204. In the illustrated embodiment, the stop tab 284 is located at the top of the terminal 206; however, the stop tab 284 may be provided at other locations in alternative embodiments. Optionally, multiple stop tabs may be provided in alternative embodiments. In various embodiments, the stop tab 284 may extend entirely circumferentially around the main body 250 at the rear. For example, the terminal 206 may include a flange at the rear defining the stop tab 284.

Figure 13:
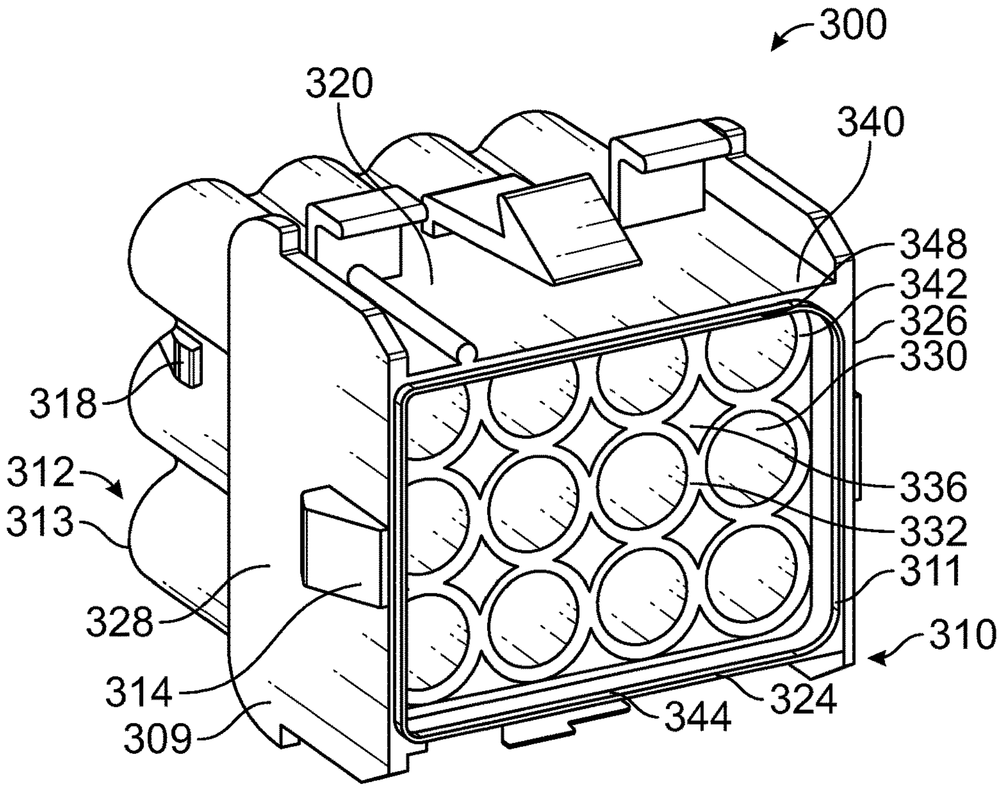
FIG. 13 is a front perspective view of the connector housing in accordance with an exemplary embodiment.
Figure 14:
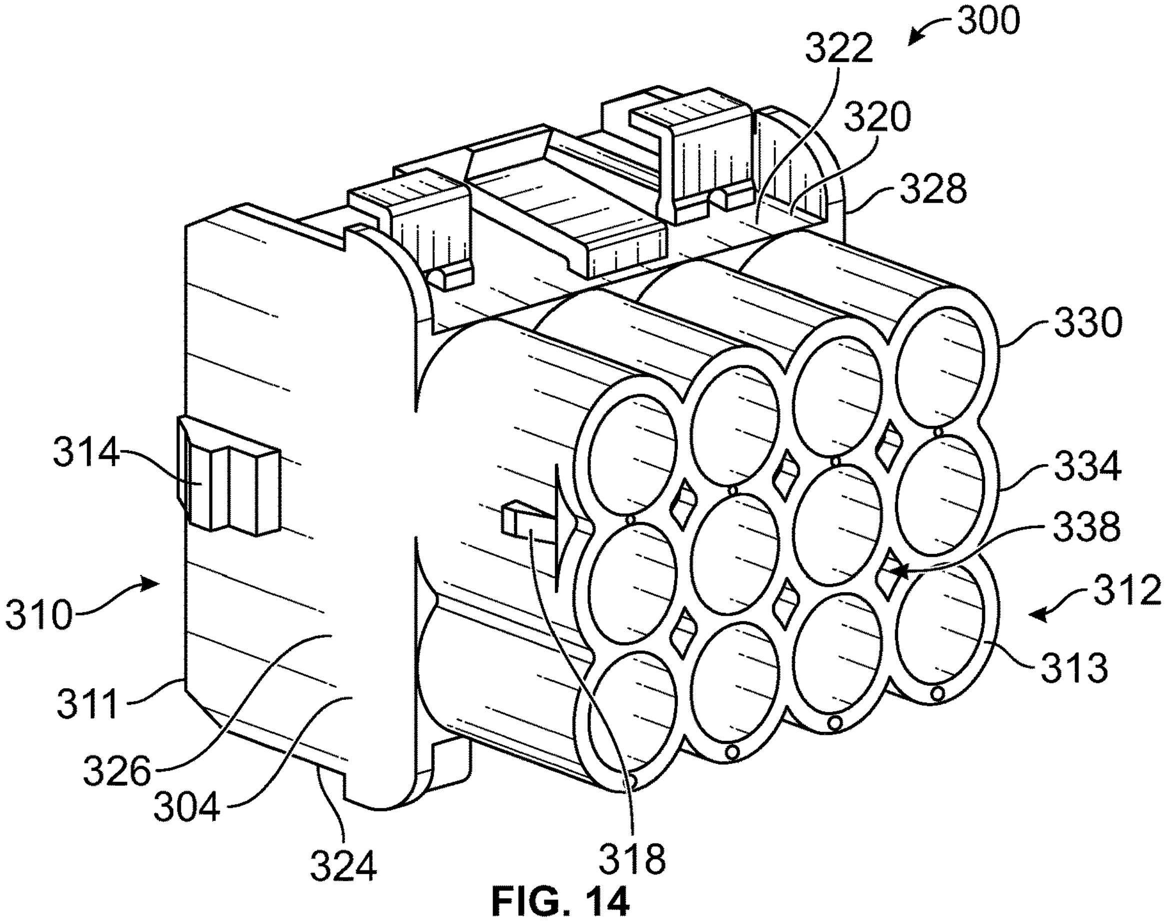
FIG. 14 is a rear perspective view of the connector housing in accordance with an exemplary embodiment.

With reference back to FIG. 4, and with additional reference to FIGS. 13 and 14, which are front and rear perspective views, respectively, of the connector housing 304, the connector housing 304 includes a base 320 and a plurality of terminal channels 330 extending through the base 320. The terminal channels 330 receive corresponding terminals 306. In an exemplary embodiment, the base 320 extends between a top 322 and a bottom 324 of the connector housing 304. The base 320 extends between a first side 326 and a second side 328 of the connector housing 304. The base 320 may be generally rectangular shaped. However, the base 320 may have other shapes in alternative embodiments.

In an exemplary embodiment, the connector housing 304 includes a shroud 340 forming a receptacle 342 that receives the mating end 210 of the connector housing 204. The shroud 340 extends forward from the base 320. The shroud 340 is located at the mating end 310 of the connector housing 304. The shroud 340 is defined by walls along the top 322, the bottom 324, the first side 326 and the second side 328. The shroud 340 extends to a mating edge 344 at the front 311. In an exemplary embodiment, the mating edge 344 is configured to sealingly engage the facial seal 120.

In an exemplary embodiment, the connector housing 304 includes terminal tubes 332 extending forward from the base 320 to the front 311 of the connector housing 304 and cable tubes 334 extending rearward from the base 320 to the rear 313 of the connector housing 304. The terminal tubes 332 extend into the receptacle 342. For example, the shroud 340 surrounds the terminal tubes 332. The terminal channels 330 are open through the terminal tubes 332 and the cable tubes 334. The terminals 306 are received in the corresponding terminal tubes 332. The cables 302 are received in the corresponding cable tubes 334. Optionally, the terminals 306 may extend into the cable tubes 334 to connect with the cables 302. In various embodiments, the base 320 may be approximately centered between the front 311 and the rear 313. For example, the terminal tubes 332 may have lengths approximately equal to the cable tubes 334. However, in alternative embodiments, the base 320 may be closer to the front 311 or closer to the rear 313. In an exemplary embodiment, the connector housing 304 includes front pockets 336 located between corresponding terminal tubes 332 and rear pockets 338 located between corresponding cable tubes 334. The pockets 336, 338 may be filled with air. For example, material of the connector housing 304 may be removed to form the pockets 336, 338 and thus reduce the weight of the connector housing 304. In the illustrated embodiment, the terminal tubes 332 and the cable tubes 334 are generally cylindrical. However, the terminal tubes 332 and/or the cable tubes 334 may have other shapes in alternative embodiments. For example, one or more of the terminal tubes 332 may have a different shape (for example, have one or more flat surfaces, such as being D-shaped) for keyed mating with the receptacle connector 300.

In an exemplary embodiment, the connector housing 304 includes a seal shoulder 348 protruding forward at the mating end 310. The seal shoulder 348 may be located at the mating edge 344 of the shroud 340. The seal shoulder 348 is configured to engage the facial seal 120 and press the facial seal 120 into sealing engagement with the connector housing 204. The seal shoulder 348 may be contoured, such as being triangular shaped.

In an exemplary embodiment, the latching features 314 extend from the sides 326, 328 of the connector housing 304. The latching features 314 may be located at other positions in alternative embodiments, such as along the top 322 and/or the bottom 324. In the illustrated embodiment, the latching features 314 extend from the exterior of the shroud 340.

In an exemplary embodiment, the connector housing 304 includes TPA latching elements 318 for securing the TPA devices 150 to the connector housing 304. In the illustrated embodiment, the TPA latching elements 318 are located at the sides 326, 328; however the TPA latching elements 318 may be located at the top 322 and the bottom 324 in alternative embodiments. The TPA latching elements 318 may be located proximate to the rear 313. For example, the TPA latching elements 318 may extend from one or more of the cable tubes 334. The TPA latching elements 318 may be at other locations in alternative embodiments.

With reference back to FIG. 4, in an exemplary embodiment, the TPA device 150 includes hollow inserts 156 configured to be plugged into the corresponding cable tubes 334. Each insert 156 includes a cable bore 158 that receives the corresponding cable 302. The TPA devices 150 may be identical to the TPA devices 140, which allows use of the same parts in both electrical connectors 200, 300, which may reduce overall cost of the electrical connector system 100 by reducing design and manufacturing costs. A distal end 159 of the insert 156 faces the rear end of the terminal 306. The distal end 159 of the insert 156 may engage the rear end of the terminal 306, such as to retain the terminal 306 in the terminal channel 330. If one of the terminals 306 is improperly loaded, such as not fully loaded, into the terminal channel 330, the distal end 159 of the insert 156 may bottom out against such terminal 306, which restricts the TPA device 150 from mating to the connector housing 304. For example, the latches 152 are unable to engage the TPA latching elements 318 when the TPA device 150 bottoms out against the improperly loaded terminal 306, which provides a visual indication to the installer that one of the terminals 306 is improperly loaded into the connector housing 304.

The terminals 306 are terminated to ends of the cables 302. In an exemplary embodiment, the terminals 306 are crimped onto the ends of the cables 302. In various embodiments, cable seals 160 may be provided at the ends of the cables 302. The terminals 306 may be crimped to the cable seals 160. The cable seals 160 are configured to sealingly engage the cables 302. The cable seals 160 are configured to be plugged into the corresponding cable tubes 334 to seal to the connector housing 304. The cable seals 160 prevent moisture or debris from entering the connector housing 304 through the rear 313. For example, the cable seals 160 seal against the cable tubes 334 and seal against the ends of the cables 302.

In an exemplary embodiment, the cable seals 160 are optional components. For example, the electrical connector 300 may be utilized with or without the cable seals 160. FIG. 4 illustrates two of the cables 302 having the cable seals 160 and two of the cables 302 without the cable seals 160 to illustrate the two different configurations. However, typically all of the cables 302 would either be sealed with the cable seals 160 or unsealed. The connector housing 304 is designed to receive the cables 302 with or without the cable seals 160. In other words, the same connector housing 304 may be used in either a sealed system or an unsealed system. Utilizing the same connector housing 304 with either sealed cables or unsealed cables reduces the overall cost of the electrical connector system 100, such as by reducing the total part numbers utilized within the electrical connector system 100. The design cost of the electrical connector system 100 is reduced because different connector housings to not need to be designed for both the sealed application and the unsealed application.

In various embodiments, the TPA devices 150 are not used when the cable seals 160 are utilized. For example, the cable tubes 334 are not sized to receive both the cable seals 160 and the TPA devices 150. Rather, the cable seals 160 may provide a visual assurance to the installer that the terminals 306 are fully loaded into the connector housing 304. For example, when the terminals 306 are not fully loaded into the connector housing 304, the cable seals 160 may be visible at or protruding from the cable tubes 334.

Figure 15:
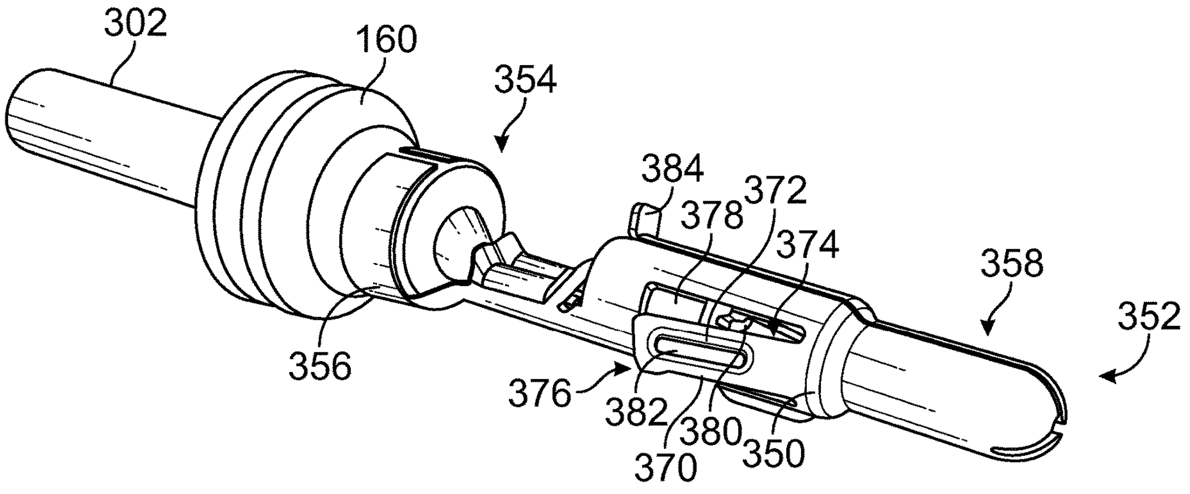
FIG. 15 is front perspective views of exemplary embodiments of the terminal in accordance with an exemplary embodiment.
Figure 16:
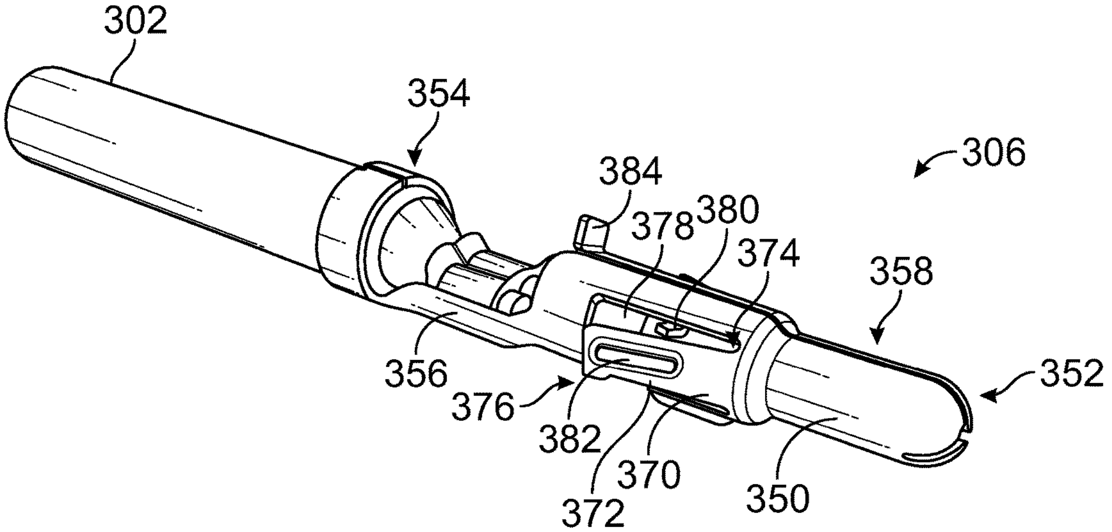
FIG. 16 is front perspective views of exemplary embodiments of the terminal in accordance with an exemplary embodiment.

With additional reference to FIGS. 15 and 16, which are front perspective views of exemplary embodiments of the terminal 306, each terminal 306 includes a main body 350 extending between a mating end 352 and a terminating end 354. The terminating end 354 is configured to be terminated to the cable 302. In an exemplary embodiment, the terminal 306 includes a crimp barrel 356 at the terminating end 354 configured to be crimped to the end of the cable 302. FIG. 15 illustrates a sealed version of the terminal 306 with the cable seal 160 provided at the end of the cable 302. FIG. 16 illustrates an unsealed version of the terminal 306. The crimp barrel 356 is crimped directly to the outer jacket of the cable 302 on the unsealed version. The crimp barrel 356 is crimped to the cable seal 160 on the sealed version.

In an exemplary embodiment, the terminal 306 includes a pin 358 at the mating end 352. The pin 358 is configured to be received in the socket 258 of the terminal 206 (FIG. 4). In an exemplary embodiment, the terminal 306 is stamped and formed. For example, the terminal 306 may be stamped from a metal sheet and formed into a tubular shape with a tapered nose defining the pin 358 at the mating end 352.

In an exemplary embodiment, the terminal 306 includes locking lances 370. The locking lances 370 are used to secure the terminal 306 in the connector housing 304. The locking lances 370 may be similar to the locking lances 270 (FIG. 4). Each locking lance 370 includes a lance arm 372 extending between a fixed end 374 and a free end 376. The locking lance 370 is angled outward from the fixed end to the free end 376 to form a gap 378 between the free end 376 and the main body 350 of the terminal 306. In an exemplary embodiment, the locking lance 370 includes an end tab 380 extending inward from the free end 376 toward the main body 350. Optionally, the end tab 380 may extend generally perpendicular to the lance arm 372. The end tab 380 may substantially fills the gap 378, such as to prevent the cables 302 from entering the 378. The end tab 380 prevents snagging of the cables 302 on the locking lances 370 during assembly, which could damage the locking lances 370.

In an exemplary embodiment, the locking lance 370 includes a strengthening rib 382 extending length-wise along the locking lance 370. In various embodiments, the strengthening rib 382 is formed integral with the lance arm 372. For example, the strengthening rib 382 may be coined or pressed from the lance arm 372 during a forming process. The strengthening rib 382 increases a buckling force necessary to buckle the locking lance 370, such as when a pulling force in a rearward pulling direction is induced on the cable 302. In an exemplary embodiment, the strengthening rib 382 extends a majority of the length of the lance arm 372 between the fixed end 374 and the free end 376.

In an exemplary embodiment, the terminal 306 includes a stop tab 384 at the rear of the main body 350. The stop tab 384 may extend radially outward from the main body 350. In an exemplary embodiment, the stop tab 384 is formed integral with the main body 350, such as being stamped and formed with the main body 350. The stop tab 384 is used to locate the terminal 306 in the connector housing 304.

Figure 17:
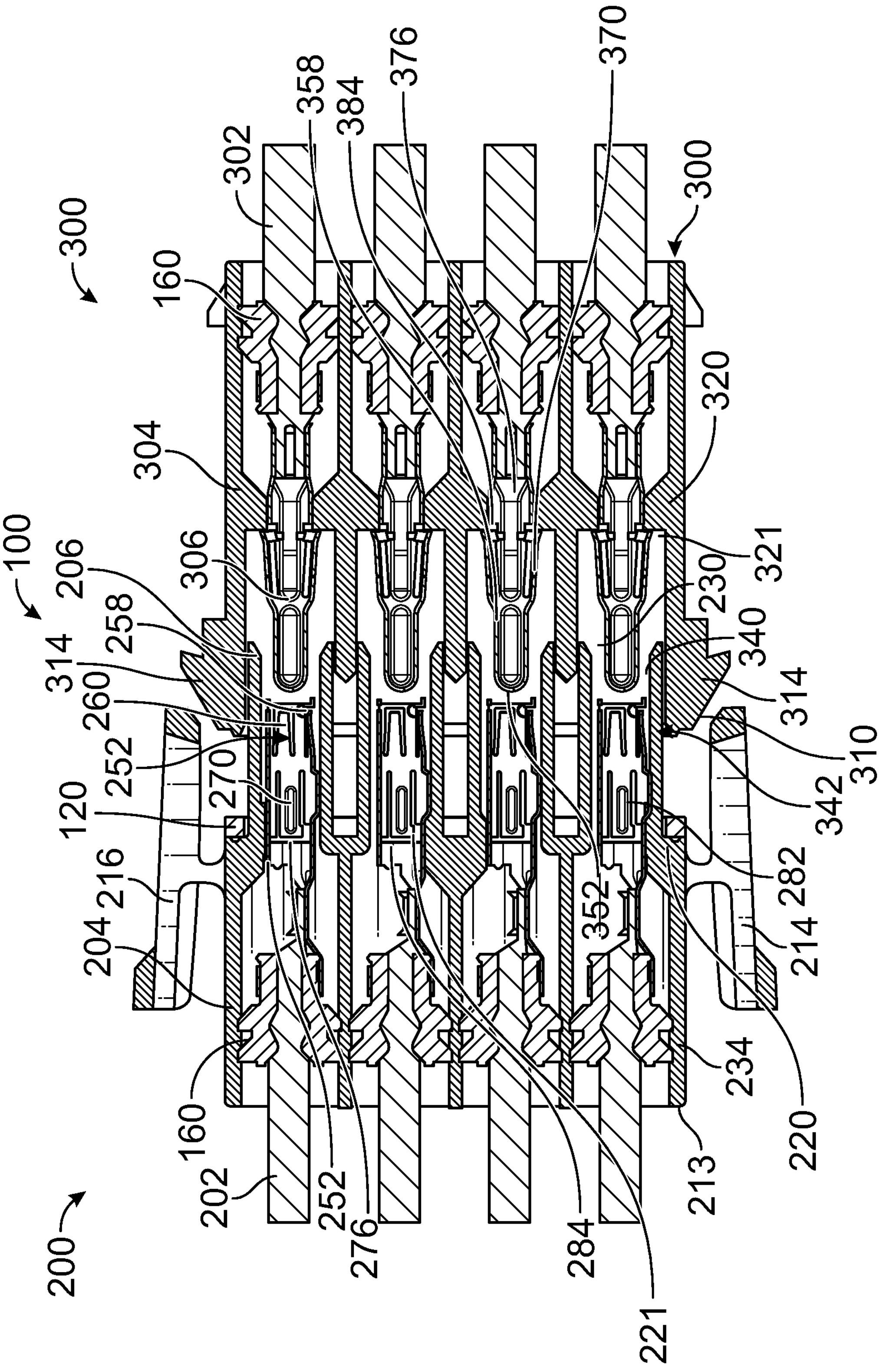
FIG. 17 is a cross-sectional view of the electrical connector system in accordance with an exemplary embodiment showing the electrical connectors in an unmated state.
Figure 18:
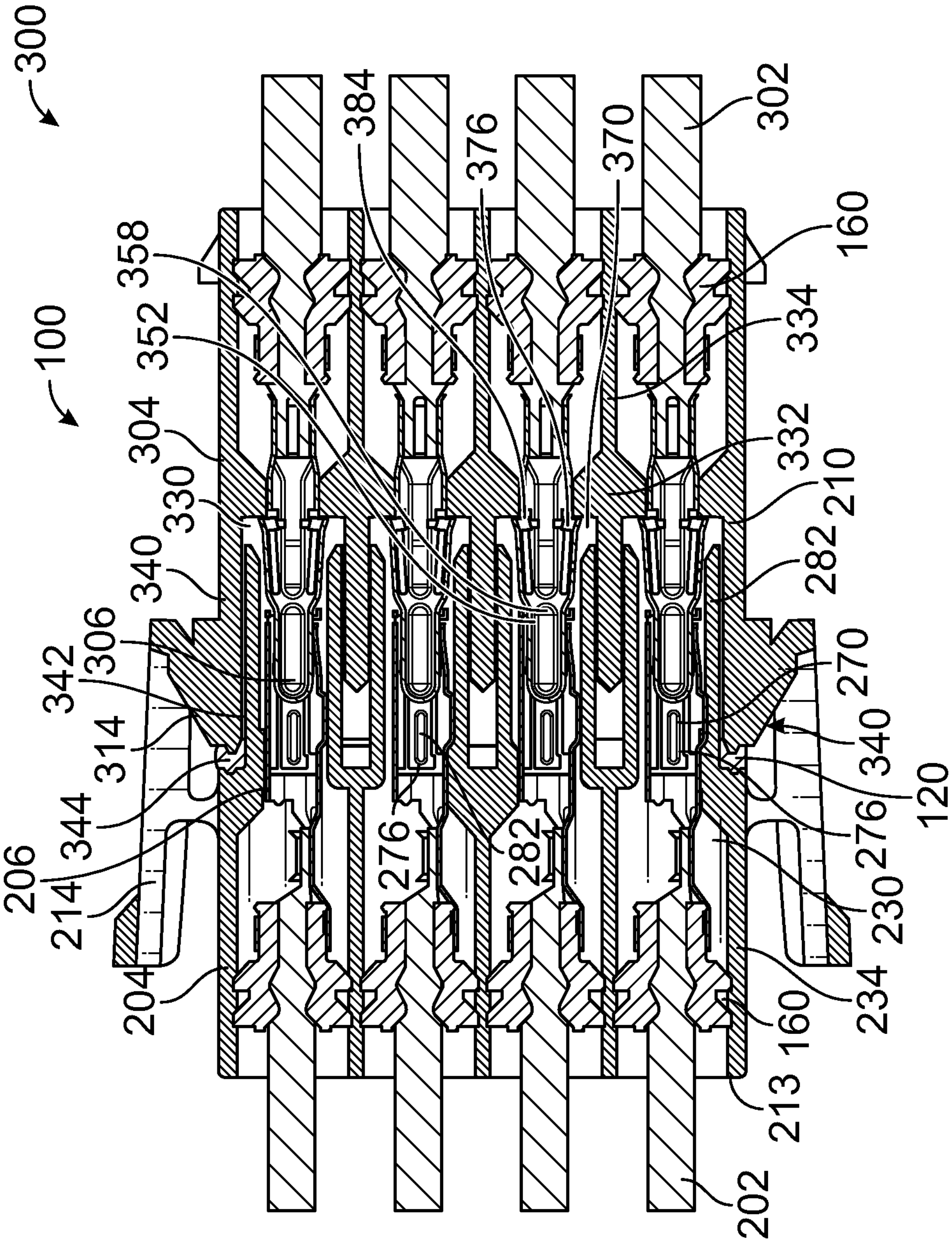
FIG. 18 is a cross-sectional view of the electrical connector system in accordance with an exemplary embodiment showing the electrical connectors in a mated state.

FIG. 17 is a cross-sectional view of the electrical connector system 100 in accordance with an exemplary embodiment showing the electrical connectors 200, 300 in an unmated state. FIG. 18 is a cross-sectional view of the electrical connector system 100 in accordance with an exemplary embodiment showing the electrical connectors 200, 300 in a mated state. The electrical connectors 200, 300 are shown as sealed connectors having the cable seals 160 sealed to the cables 202, 302 and the connector housings 204, 304. For example, the cable seals 160 are received in the cable tubes 234, 334 and sealed to the connector housings 204, 304 in the cable tubes 234, 334.

During assembly, the terminals 206 and cables 202 are loaded into the connector housing 204, such as through the rear 213. The terminals 206 and cables 202 are loaded into the terminal channels 230 through the cable tubes 234. The terminals 206 pass through the base 220 into the terminal tubes 232. The sockets 258 at the mating ends 252 of the terminals 206 are positioned in the terminal tubes 232 for mating with the terminals 306. When the terminals 206 are fully inserted into the connector housing 204, the locking lances 270 flex outward to engage the connector housing 204 to hold the terminals 206 in the connector housing 204. For example, the free ends 276 of the locking lances 270 engage a retention shoulder 221 of the base 220. The locking lances 270 prevent rearward pullout of the terminals 206 form the connector housing 204. The strengthening ribs 282 increase the buckling force necessary to buckle the locking lances 270, such as when a pulling force in a rearward pulling direction is induced on the cables 202. In an exemplary embodiment, the terminals 206 are loaded into the connector housing 204 until the stop tabs 284 engage (for example, bottom out against) the base 220 or a retention shoulder (not shown) of the base 220. The stop tabs 284 prevent forward movement of the terminals 206 into the connector housing 204 beyond a stop position. In an exemplary embodiment, the base 220 is captured between the stop tabs 284 and the locking lances 270.

During assembly, the terminals 306 and cables 302 are loaded into the connector housing 304, such as through the rear 313. The terminals 306 and cables 302 are loaded into the terminal channels 330 through the cable tubes 334. The terminals 306 pass through the base 320 into the terminal tubes 332. The pins 358 at the mating ends 352 of the terminals 306 are positioned in the terminal tubes 332 for mating with the sockets 258 of the terminals 206. When the terminals 306 are fully inserted into the connector housing 304, the locking lances 370 flex outward to engage the connector housing 304 to hold the terminals 306 in the connector housing 304. For example, the free ends 376 of the locking lances 370 engage a retention shoulder 321 of the base 320. The locking lances 370 prevent rearward pullout of the terminals 306 form the connector housing 304. The strengthening ribs 382 increase the buckling force necessary to buckle the locking lances 370, such as when a pulling force in a rearward pulling direction is induced on the cables 302. In an exemplary embodiment, the terminals 306 are loaded into the connector housing 304 until the stop tabs 384 engage (for example, bottom out against) the base 320 or a retention shoulder (not shown) of the base 320. The stop tabs 384 prevent forward movement of the terminals 306 into the connector housing 304 beyond a stop position. In an exemplary embodiment, the base 320 is captured between the stop tabs 384 and the locking lances 370.

During mating, the mating end 210 of the connector housing 204 is plugged into the receptacle 342 at the mating end 310 of the connector housing 304. The shroud 340 surrounds the mating end 210 of the connector housing 204. In an exemplary embodiment, the terminal tubes 232 are loaded into the terminal tubes 332. The terminals 206 are mated to the terminals 306. For example, the pins 358 are loaded into the sockets 258. The mating beams 260 engage the pins 358 of the terminals 306 to electrically engage the terminals 206 to the terminals 306. The centering bumps 362 center the pins 358 within the sockets 258, such as to prevent overstress of any one of the mating beams 260. The electrical connectors 200, 300 are mated until the latch 214 latchably engages the latching features 314. In an exemplary embodiment, the window 216 through the latch 214 exposes the latching features 314 for visual inspection or verification that the latches 214 are latchably coupled to the latching features 314.

The facial seal 120 is positioned between the connector housings 204, 304 to provide a sealed mating interface between the electrical connectors 200, 300. The facial seal 120 is coupled to the connector housing 204. When mated, the mating edge 344 of the connector housing 304 engage the facial seal 120.

Figure 19:
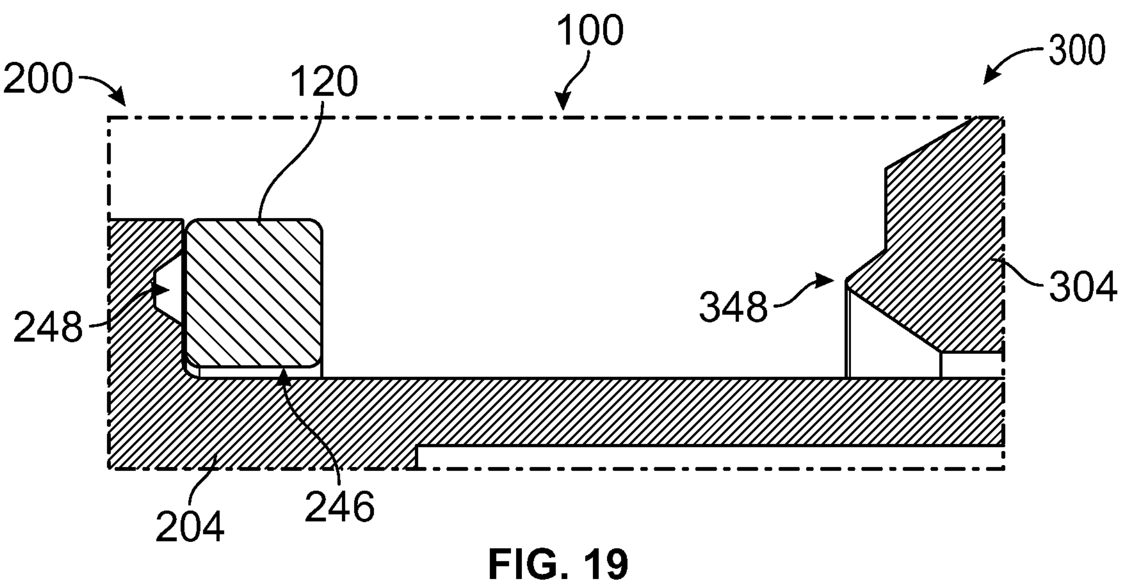
FIG. 19 is an enlarged cross-sectional view of a portion of the electrical connector system showing the facial seal between the connector housings when the electrical connectors are in the unmated state in accordance with an exemplary embodiment.
Figure 20:
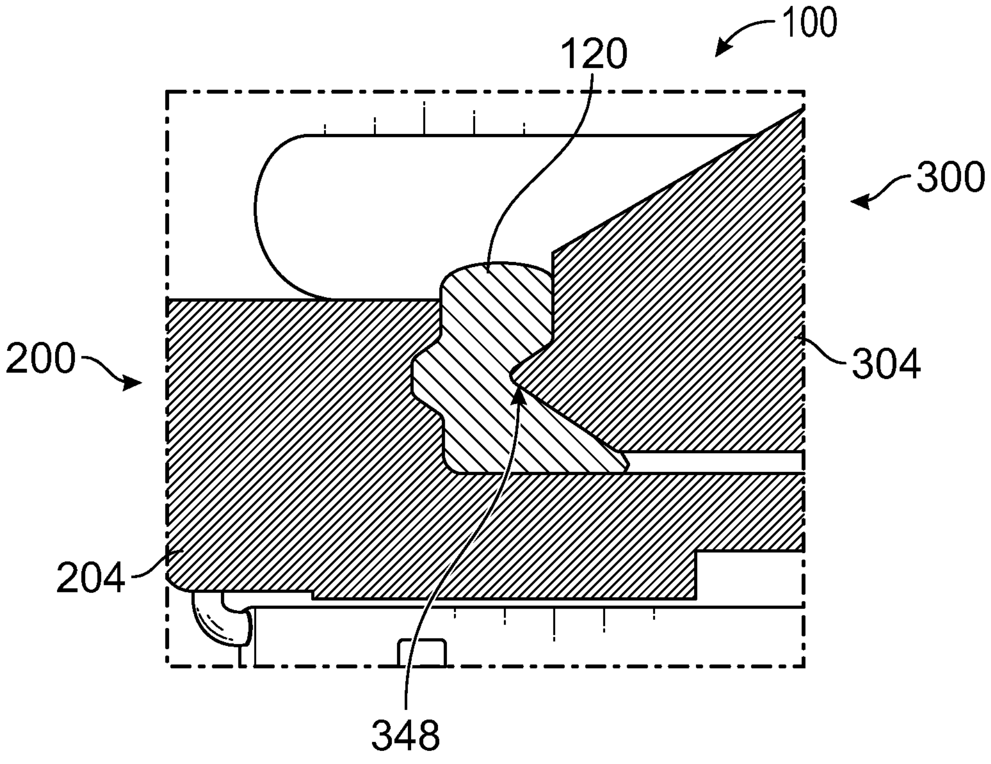
FIG. 20 is an enlarged cross-sectional view of a portion of the electrical connector system showing the facial seal between the connector housings when the electrical connectors are in the mated state in accordance with an exemplary embodiment.

FIG. 19 is an enlarged cross-sectional view of a portion of the electrical connector system 100 showing the facial seal 120 between the connector housings 204, 304 when the electrical connectors 200, 300 are in the unmated state. FIG. 20 is an enlarged cross-sectional view of a portion of the electrical connector system 100 showing the facial seal 120 between the connector housings 204, 304 when the electrical connectors 200, 300 are in the mated state.

The facial seal 120 is positioned in the seal pocket 246 at the mating end 210 of the connector housing 204. When assembled, the facial seal 120 is aligned with the groove 248. In various embodiments, the facial seal 120 does not necessarily extend into the groove 248 prior to mating with the seal shoulder 348 of the connector housing 304. When mated (FIG. 20), the seal shoulder 348 presses into the facial seal 120. The seal shoulder 348 may compress the facial seal 120. In an exemplary embodiment, the seal shoulder 348 forces the facial seal 120 into the groove 248 to lock the facial seal 120 in the seal pocket 246. The facial seal 120 is compressed between the connector housings 204, 304 to create sealed interfaces with the connector housing 204, 304.

Figure 21:
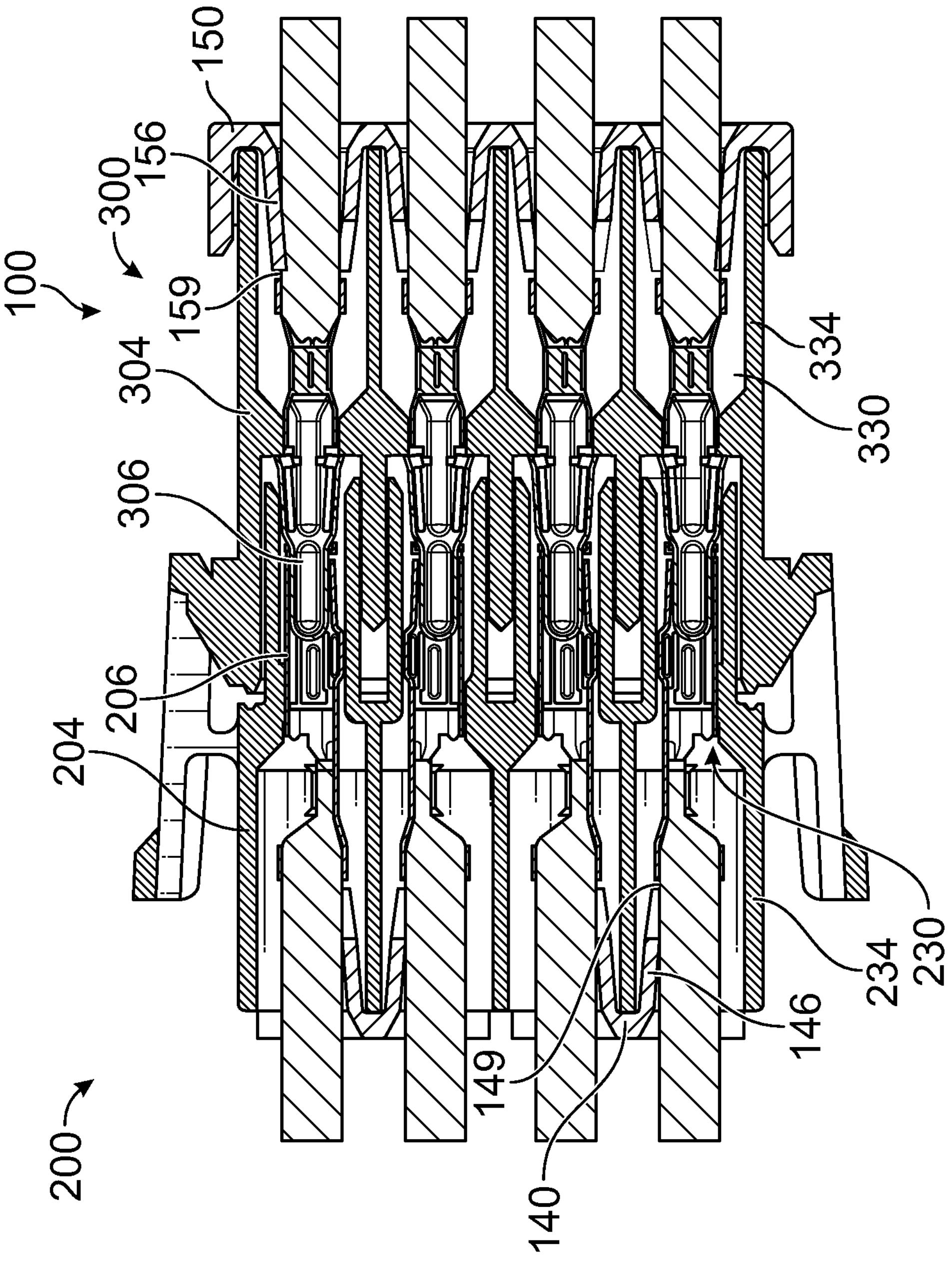
FIG. 21 is a cross-sectional view of the electrical connector system in accordance with an exemplary embodiment showing the electrical connectors in a mated state.

FIG. 21 is a cross-sectional view of the electrical connector system 100 in accordance with an exemplary embodiment showing the electrical connectors 200, 300 in a mated state. The electrical connectors 200, 300 are shown as unsealed connectors (without the cable seals 160 shown in FIGS. 17 and 18). In the illustrated embodiment, the TPA devices 140, 150 are used to assure that the terminals 206, 306 are properly positioned after assembly.

During assembly, after the terminals 206, 306 are loaded into the connector housings 204, 304, respectively, the TPA devices 140, 150 are coupled to the rear ends of the connector housings 204, 304. The inserts 146, 156 of the TPA devices 140, 150 are plugged into the corresponding cable tubes 234, 334. The distal ends 149, 159 face the rear ends of the terminal 206, 306. The distal ends 149, 159 may engage the rear ends to retain the terminals 206, 306 in the terminal channel 230, 330. If one of the terminals 206 or 306 is improperly loaded, such as not fully loaded, into the terminal channel 230 or 330, the distal end 149, 159 may bottom out against such terminal 206, 306, which restricts the TPA device 140, 150 from mating to the connector housing 204, 304, respectively, which provides a visual indication to the installer that one of the terminals 206, 306 is improperly loaded into the connector housing 204, 304.

Figure 22:
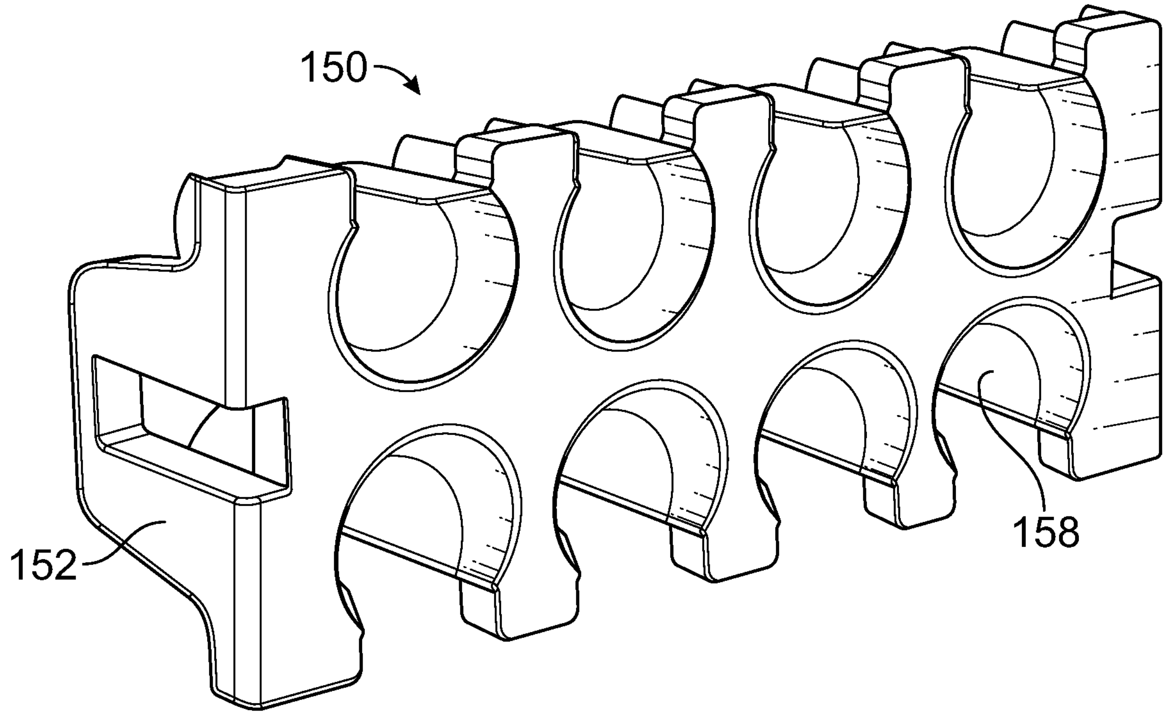
FIG. 22 is a rear perspective view of the TPA device in accordance with an exemplary embodiment.

FIG. 22 is a rear perspective view of the TPA device 150 in accordance with an exemplary embodiment. In the illustrated embodiment, the TPA device 150 includes two rows of cable bores 158 to receive two rows of cables. The cable bores 158 are open at sides thereof, such as for side loading the cables into the cable bores 158. In the illustrated embodiment, the latches 152 of the TPA device 150 are provided at the sides. However, other locations are possible in alternative embodiments.

Figure 23:
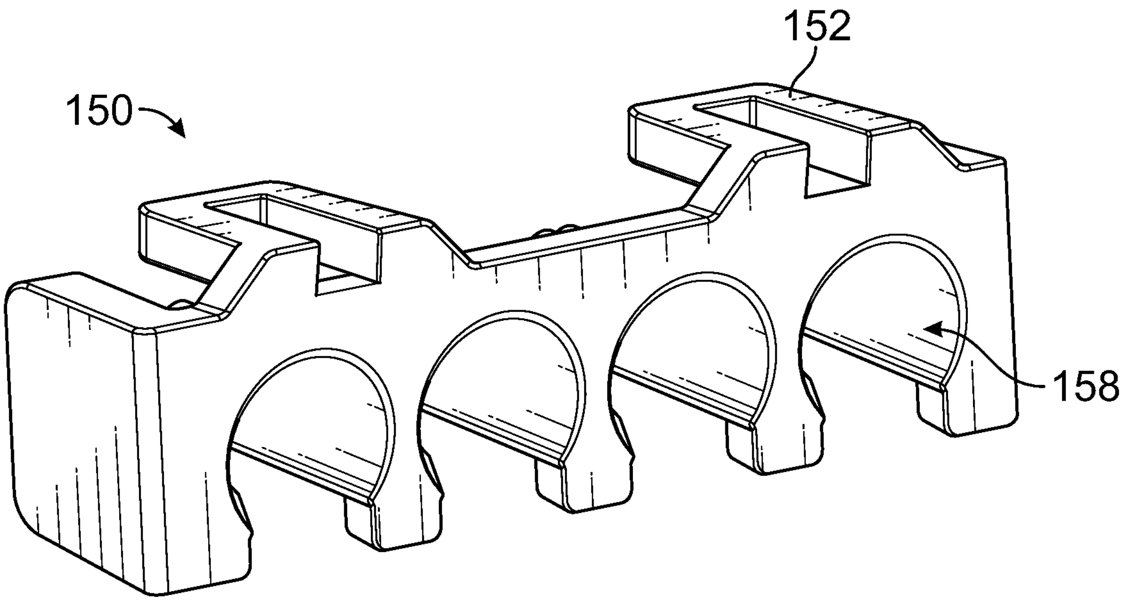
FIG. 23 is a rear perspective view of the TPA device in accordance with an exemplary embodiment.

FIG. 23 is a rear perspective view of the TPA device 150 in accordance with an exemplary embodiment. In the illustrated embodiment, the TPA device 150 includes a single row of cable bores 158. The cable bores 158 are open at the bottoms thereof, such as for loading the cables into the cable bores 158 through the bottom. In the illustrated embodiment, the latches 152 of the TPA device 150 are provided at the top. However, other locations are possible in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector system comprising:

a connector housing including a base and a plurality of terminal cavities extending through the base, the base including a retention shoulder within each terminal cavity; and terminals received in the corresponding terminal cavities, each terminal including a locking lance engaging the corresponding retention shoulder to retain the terminal in the corresponding terminal cavity, each locking lance including a strengthening rib extending lengthwise along the locking lance approximately centered along the locking lance between opposite sides of the locking lance.

2. The electrical connector system of claim 1, wherein the strengthening rib protrudes in a thickness direction from the locking lance and is spaced apart from the opposite sides of the locking lance.

3. The electrical connector system of claim 1, wherein the locking lance includes a lance arm extending from a fixed end to a free end, the free end engaging the retention shoulder, the strengthening rib extending a majority of a length of the lance arm between the fixed end and the free end.

4. The electrical connector system of claim 1, wherein the strengthening rib increases a buckling force necessary to buckle the locking lance.

5. The electrical connector system of claim 1, wherein the locking lance includes an end tab extending inward from an end of the locking lance.

6. The electrical connector system of claim 1, wherein the locking lance extends between a fixed end and a free end, the locking lance being angled outward from the fixed end to the free end to form a gap between the free end and a main body of the terminal, the locking lance including an end tab extending inward from the free end toward the main body to at least partially close the gap.

7. The electrical connector system of claim 1, wherein the terminal includes a main body extending between a front and a rear, the terminal including a crimp barrel extending rearward of the rear for connection to a cable, the main body including a stop tab extending outward from the end, the stop tab configured to engage the base of the connector housing to locate the terminal in the terminal cavity.

8. The electrical connector system of claim 7, wherein the terminal is loaded into the terminal cavity such that the base is captured between the stop tab and the locking lance, the stop tab preventing forward movement of the terminal in the terminal cavity, the locking lance preventing rearward movement of the terminal in the terminal cavity.

9. The electrical connector system of claim 1, wherein the terminal includes a main body extending between a front and a rear, the terminal including a crimp barrel rearward of the rear, the crimp barrel being crimped to an end of a cable, wherein the crimp barrel is crimped to a cable seal to hold the cable seal on the end of the cable.

10. The electrical connector system of claim 1, wherein the terminal includes a main body extending between a front and a rear, the terminal including a socket at the front configured to receive a pin terminal of a mating electrical connector, the terminal including a plurality of mating beams extending into the socket to electrically connect to the pin terminal.

11. The electrical connector system of claim 10, wherein the mating beams are angularly offset and have uniform spacing between the mating beams.

12. The electrical connector system of claim 10, wherein the terminal includes centering bumps proximate to the front of the main body, the centering bumps being angularly offset from the mating beams, the centering bumps are configured to locate the pin coincident with the socket.

13. The electrical connector system of claim 12, wherein the centering bumps are located forward of mating interfaces of the mating beams such that the centering bumps interface with the pin prior to the mating beams interfacing with the pin during mating.

14. The electrical connector system of claim 1, wherein the terminal cavities are arranged in rows and columns to hold the terminals in rows and columns for mating with mating terminals of a mating electrical connector.

15. The electrical connector system of claim 1, wherein the connector housing includes terminal tubes forward of the base and cable tubes rearward of the base, the terminal cavities extending through the corresponding terminal tubes and the corresponding cable tubes, the terminals including mating ends in the corresponding terminal tubes for mating with mating terminals of a mating electrical connector, the terminals being terminated to cables, the cables extending through the cable tubes to exit the connector housing.

16. The electrical connector system of claim 15, wherein front pockets are located between corresponding terminal tubes and rear pockets are located between corresponding cable tubes.

17. The electrical connector system of claim 1, wherein the connector housing includes a latch configured to latchably secure the connector housing to a latching feature of the mating electrical connector, the latch including a window through the latch, the window allowing visual access to the latching feature of the mating electrical connector when the latch is latchably coupled to the latching feature.

18. The electrical connector system of claim 1, further comprising a terminal position assurance (TPA) device coupled to the connector housing, the TPA including retaining shoulders at a front of the TPA device received in corresponding terminal cavities to engage the terminals.

19. The electrical connector system of claim 1, further comprising a facial seal at a mating end of the connector housing, the facial seal configured to seal between the mating end of the connector housing and a mating connector housing of a mating electrical connector.

20. The electrical connector system of claim 19, wherein the connector housing includes a seal pocket at the mating end, the facial seal being received in the seal pocket.

21. The electrical connector system of claim 20, wherein the seal pocket includes a groove, the facial seal being pressed into the groove by the mating connector housing to lock the facial seal in the seal pocket.

22. The electrical connector system of claim 19, wherein the connector housing includes a seal shoulder protruding forward at the mating end, the seal shoulder configured to engage the facial seal and press the facial seal into sealing engagement with the mating connector housing.

23. An electrical connector system comprising:

a connector housing including a base and a plurality of terminal cavities extending through the base, the base including a retention shoulder within each terminal cavity, the connector housing extending between a mating end and a cable end, the mating end configured to be mated with a mating electrical connector, the connector housing including a seal pocket at the mating end the seal pocket including a groove;

a facial seal received in the seal pocket, the facial seal including a first sealing surface engaging the connector housing and being sealed against the connector housing, the facial seal including a second sealing surface configured to engage a mating connector housing of the mating electrical connector; and terminals received in the corresponding terminal cavities, the terminals being terminated to ends of cables extending from the cable end of the connector housing, each terminal including a locking lance engaging the corresponding retention shoulder to retain the terminal in the corresponding terminal cavity;

wherein the facial seal is configured to be pressed into the groove by the mating connector housing to lock the facial seal in the seal pocket.

24. An electrical connector system comprising:

a connector housing including a base and a plurality of terminal cavities extending through the base, the base including a retention shoulder within each terminal cavity, the connector housing extending between a mating end and a cable end, the mating end configured to be mated with a mating electrical connector; and terminals received in the corresponding terminal cavities, each terminal including a locking lance engaging the corresponding retention shoulder to retain the terminal in the corresponding terminal cavity, each terminal including a main body extending between a front and a rear, the terminal including a socket at the front configured to receive a pin terminal of the mating electrical connector, the terminal including a plurality of mating beams extending into the socket to electrically connect to the pin terminal, the terminal including centering bumps proximate to the front of the main body, the centering bumps being angularly offset from the mating beams. the centering bumps are configured to locate the pin coincident with the socket.

25. The electrical connector system of claim 24, wherein the mating beams are angularly offset and have uniform spacing between the mating beams.

26. The electrical connector system of claim 24, wherein the centering bumps are located forward of mating interfaces of the mating beams such that the centering bumps interface with the pin prior to the mating beams interfacing with the pin during mating.

* * * * *